US010867251B2

United States Patent
Motohashi

(10) Patent No.: US 10,867,251 B2
(45) Date of Patent: Dec. 15, 2020

(54) ESTIMATION RESULTS DISPLAY SYSTEM, ESTIMATION RESULTS DISPLAY METHOD, AND ESTIMATION RESULTS DISPLAY PROGRAM

(71) Applicant: NEC Corporation, Tokyo (JP)

(72) Inventor: Yousuke Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 888 days.

(21) Appl. No.: 15/731,173

(22) PCT Filed: Apr. 30, 2015

(86) PCT No.: PCT/JP2015/002296
§ 371 (c)(1),
(2) Date: Apr. 27, 2017

(87) PCT Pub. No.: WO2016/067483
PCT Pub. Date: May 6, 2016

(65) Prior Publication Data
US 2018/0330262 A1    Nov. 15, 2018

(30) Foreign Application Priority Data

Oct. 28, 2014   (JP) ................................. 2014-219564

(51) Int. Cl.
*G06T 11/20* (2006.01)
*G06N 7/00* (2006.01)
(Continued)

(52) U.S. Cl.
CPC ............. *G06N 7/005* (2013.01); *G06N 5/003* (2013.01); *G06N 20/00* (2019.01); *G06N 20/20* (2019.01); *G06T 11/206* (2013.01)

(58) Field of Classification Search
CPC ........ G06N 7/005; G06N 20/20; G06N 20/00; G06N 5/003; G06T 11/206
See application file for complete search history.

(56) References Cited

U.S. PATENT DOCUMENTS

2005/0096758 A1* 5/2005 Takezawa ............ G05B 13/048
700/44
2006/0189009 A1    8/2006 Ahn et al.
(Continued)

FOREIGN PATENT DOCUMENTS

JP    2000-181526 A    6/2000
JP    2013-196037      9/2013

OTHER PUBLICATIONS

Ken Matsubara, "Ippo Susunda Kikai Gakusho IoT de Gekizo suru Data no Katsuyo Genba ni Shinto [Advanced machine learning—Utilizing data that is rapidly increasing with IoT Penetration into the site]", Nkkei Big Data, Jun. 10, 2014, pp. 7-12, Internet URL: http://business.nikkeibp.co.jp/article/bigdata/20140604/266216/ (Machine Translation).

(Continued)

*Primary Examiner* — Vincent Gonzales
*Assistant Examiner* — Casey R. Garner
(74) *Attorney, Agent, or Firm* — Finnegan, Henderson, Farabow, Garrett & Dunner, L.L.P.

(57) ABSTRACT

An estimation results display system that, in the case of displaying an estimation result derived using a learning model, enables persons to recognize how condition determination is performed to select the learning model is provided. Input means 91 receives input of information associating information indicating a learning model selected depending on a determination result of whether or not an attribute in estimation data including one or more types of attributes satisfies one or more types of conditions and an estimation result derived using the learning model. Display means 92 displays the estimation result, in association with the information indicating the learning model used for deriving the estimation result and a condition subjected to (Continued)

determination of whether or not satisfied by the attribute in the estimation data when selecting the learning model.

12 Claims, 29 Drawing Sheets

(51) Int. Cl.
  *G06N 20/00* (2019.01)
  *G06N 20/20* (2019.01)
  *G06N 5/00* (2006.01)

(56) References Cited

U.S. PATENT DOCUMENTS

| | | | | |
|---|---|---|---|---|
| 2010/0162152 | A1* | 6/2010 | Allyn | G06T 11/206 715/767 |
| 2013/0187924 | A1* | 7/2013 | Ogata | G06T 11/206 345/440 |
| 2014/0222741 | A1 | 8/2014 | Eto et al. | |
| 2014/0370480 | A1* | 12/2014 | Sugibuchi | G09B 7/02 434/322 |
| 2015/0379424 | A1* | 12/2015 | Dirac | G06N 20/00 706/12 |
| 2015/0379429 | A1* | 12/2015 | Lee | G06N 20/00 706/11 |

OTHER PUBLICATIONS

Stef van den Elzen et al., "BaobabView: Interactive construction and analysis of decision trees", Visual Analytics Science and Technology (VAST), 2011 IEEE Conference on, IEEE, Oct. 23, 2011, pp. 151-160, XP032073854, DOI: 10.1109/VAST.2011.6102453, ISBN: 978-1-4673-0015-5.

European Patent Office Communication dated May 24, 2019, issued in counterpart European Patent Application No. 15 855 787.6.

"Machine leaning one step ahead, penetrating into the field of use of data drastically increased due to IoT", Nikkei Business Publications, Inc., "Nikkei Big Data", 2014, vol. 06, pp. 7-12.

Ippo Susunda Kikai Gakushu IoT de Gekizo suru Data no Katsuyo Genba ni Shinto, Nikkei Big Data, the Jun. 2014 issue, Nikkei Business Publications, Inc., pp. 7-12, Jun. 10, 2014.

International Search Report and Written Opinion of ISA dated Jul. 21, 2015, in corresponding PCT International Application.

International Preliminary Search Report dated May 4, 2017, in corresponding PCT JP2015/002296.

Extended European Search Report dated May 14, 2018, issued in counterpart European Patent Application No. 15855787.6.

\* cited by examiner

FIG. 3

| ESTIMATION DATA IDENTIFIER | AIR TEMPERATURE (°C) | PRECIPITATION (mm/h) | WIND SPEED (m/s) | TIME |
|---|---|---|---|---|
| ID=1 | 21.1 | 0.0 | 0.5 | 09:00:00 |
| ID=2 | 20.5 | 0.1 | 0.3 | 10:00:00 |
| ID=3 | 19.8 | 0.1 | 0.8 | 11:00:00 |
| | | | | |

FIG. 4

| ESTIMATION RESULT DATA IDENTIFIER | ESTIMATION DATA | ESTIMATION RESULT (CLEAN WATER USAGE ESTIMATED VALUE m³) | LEARNING MODEL | TIME |
|---|---|---|---|---|
| ID=a1 | ESTIMATION DATA (ID=1) | 4.3 | LEARNING MODEL 1 | 09:00:00 |
| ID=a2 | ESTIMATION DATA (ID=2) | 4.0 | LEARNING MODEL 1 | 10:00:00 |
| ID=a3 | ESTIMATION DATA (ID=3) | 4.7 | LEARNING MODEL 3 | 11:00:00 |

FIG. 13

|  |  | AIR TEMPERATURE | |
|---|---|---|---|
|  |  | LESS THAN 20°C | 20°C OR MORE |
| PRECIPITATION | LESS THAN 10 mm/h | LEARNING MODEL 3 | LEARNING MODEL 1 |
|  | 10 mm/h OR MORE | LEARNING MODEL 2 | |

ESTIMATION RESULTS DISPLAY SYSTEM, ESTIMATION RESULTS DISPLAY METHOD, AND ESTIMATION RESULTS DISPLAY PROGRAM

CROSS-REFERENCE TO RELATED PATENT APPLICATIONS

This application is a National Stage Entry of International Application No. PCT/JP2015/002296, filed Apr. 30, 2015, which claims priority from Japanese Patent Application No. 2014-219564, filed Oct. 28, 2014. The entire contents of the above-referenced applications are expressly incorporated herein by reference.

TECHNICAL FIELD

The present invention relates to an estimation results display system, estimation results display method, and estimation results display program for displaying an estimation result derived using a learning model.

BACKGROUND ART

Non Patent Literature (NPL) 1 describes automatically selecting a prediction expression from a plurality of prediction expressions and, in the case of calculating a predicted value using the prediction expression, displaying a graph of the predicted value and an actual value and also displaying a graph representing the changes of the selected prediction expression.

CITATION LIST

Non Patent Literature

NPL 1: "Machine learning one step further: penetration into fields utilizing data burgeoning through IoT" (Ippo susunda kikai gakushu: IoT de gekizou suru deta no katsuyougenba ni shintou), Nikkei Business Publications, Inc., "Nikkei Big Data", 2014, No. 6, p. 7-12

SUMMARY OF INVENTION

Technical Problem

When deriving an estimation result such as a predicted value, there is a case where a learning model is automatically selected from a plurality of learning models and an estimation result is derived using the learning model. An example of the method of selecting a learning model is a method of determining whether or not various attributes included in estimation data satisfy predetermined various conditions and selecting a learning model depending on the determination result. Here, depending on whether or not one condition is satisfied, a condition subjected to next determination of whether or not satisfied by an attribute may change. The attributes included in the estimation data are, for example, air temperature, precipitation, etc., but are not limited to such.

NPL 1 describes displaying the graph of the predicted value and the actual value and also displaying the graph representing the changes of the selected prediction expression. In such a display mode, persons have difficulty in recognizing how condition determination is performed to select the prediction expression (learning model).

It is preferable that, in the case of displaying an estimation result derived using a learning model, persons can recognize how condition determination is performed to select the learning model.

It is also preferable that, even though persons cannot clearly recognize how condition determination is performed to select the learning model, they can estimate the tendency of each attribute in estimation data when selecting each individual learning model.

The present invention accordingly has an object of providing an estimation results display system, estimation results display method, and estimation results display program that, in the case of displaying an estimation result derived using a learning model, enable persons to recognize how condition determination is performed to select the learning model.

The present invention also has an object of providing an estimation results display system, estimation results display method, and estimation results display program that enable persons to estimate the tendency of each attribute in estimation data when selecting each individual learning model.

Solution to Problem

An estimation results display system according to the present invention includes: input means for receiving input of information associating information indicating a learning model selected depending on a determination result of whether or not an attribute in estimation data including one or more types of attributes satisfies one or more types of conditions and an estimation result derived using the learning model; and display means for displaying the estimation result, in association with the information indicating the learning model used for deriving the estimation result and a condition subjected to determination of whether or not satisfied by the attribute in the estimation data when selecting the learning model.

An estimation results display system according to the present invention includes: input means for receiving input of information associating information indicating a learning model selected depending on a determination result of whether or not an attribute in estimation data including one or more types of attributes satisfies one or more types of conditions, an estimation result derived using the learning model, and the estimation data; and display means for displaying a temporal change of the estimation result and a temporal change of the learning model, and displaying a graph representing a temporal change of the attribute in the estimation data.

An estimation results display method according to the present invention includes: receiving input of information associating information indicating a learning model selected depending on a determination result of whether or not an attribute in estimation data including one or more types of attributes satisfies one or more types of conditions and an estimation result derived using the learning model; and displaying the estimation result, in association with the information indicating the learning model used for deriving the estimation result and a condition subjected to determination of whether or not satisfied by the attribute in the estimation data when selecting the learning model.

An estimation results display method according to the present invention includes: receiving input of information associating information indicating a learning model selected depending on a determination result of whether or not an attribute in estimation data including one or more types of attributes satisfies one or more types of conditions, an estimation result derived using the learning model, and the estimation data; and displaying a temporal change of the estimation result and a temporal change of the learning model, and displaying a graph representing a temporal change of the attribute in the estimation data.

An estimation results display program according to the present invention is an estimation results display program provided in a computer including input means for receiving input of information associating information indicating a learning model selected depending on a determination result of whether or not an attribute in estimation data including one or more types of attributes satisfies one or more types of conditions and an estimation result derived using the learning model, the estimation results display program causing the computer to execute a display process of displaying the estimation result, in association with the information indicating the learning model used for deriving the estimation result and a condition subjected to determination of whether or not satisfied by the attribute in the estimation data when selecting the learning model.

An estimation results display program according to the present invention is an estimation results display program provided in a computer including input means for receiving input of information associating information indicating a learning model selected depending on a determination result of whether or not an attribute in estimation data including one or more types of attributes satisfies one or more types of conditions, an estimation result derived using the learning model, and the estimation data, the estimation results display program causing the computer to execute a display process of displaying a temporal change of the estimation result and a temporal change of the learning model, and displaying a graph representing a temporal change of the attribute in the estimation data.

Advantageous Effects of Invention

According to the present invention, in the case of displaying an estimation result derived using a learning model, persons can recognize how condition determination is performed to select the learning model.

Moreover, according to the present invention, persons can estimate the tendency of each attribute in estimation data when selecting each individual learning model.

BRIEF DESCRIPTION OF DRAWINGS

FIG. 3 is a diagram depicting an example of estimation data.

FIG. 4 is a diagram depicting an example of information output by the estimator.

FIG. 13 is an explanatory diagram depicting an example of a selection model displayed based on selection model display data in Exemplary Embodiment 4.

DESCRIPTION OF EMBODIMENT

The following describes exemplary embodiments of the present invention with reference to drawings.

Figure 1:
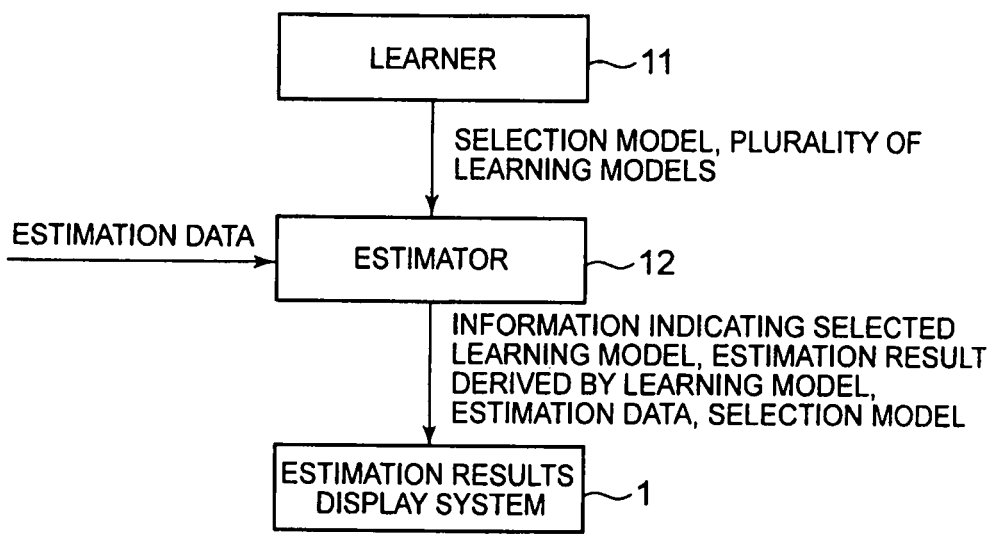
FIG. 1 is a schematic diagram depicting a learner and an estimator.

A learner and an estimator are described first, in relation to an estimation results display system according to the present invention. FIG. 1 is a schematic diagram depicting a learner and an estimator. The following uses a specific example of estimating (predicting) the value of an objective variable, that is, clean water usage, based on the values of explanatory variables such as air temperature, precipitation, and wind speed, to facilitate understanding.

A learner 11 generates a plurality of learning models using learning data beforehand. Each learning model is a model for deriving an estimation result when estimation data is given. In other words, the estimation result is obtained by applying the learning model to the estimation data. The learning model is, for example, information indicating regularity between an explanatory variable and an objective variable, which is derived from learning data. For example, the learning model is generated in the form of an estimation expression. In this case, the estimation result is calculated by assigning the estimation data to the explanatory variable of the estimation expression. Although an example where the learning model is in the form of an estimation expression is described here, the form of the learning model is not limited to an estimation expression. The plurality of learning models generated by the learner 11 are used in an estimator 12.

The estimator 12 receives input of estimation data including one or more types of attributes, and selects, from among the plurality of learning models, a learning model corresponding to a determination result of whether or not the attribute (or attributes) included in the estimation data satisfies one or more types of conditions. The estimator 12 then derives an estimation result using the estimation data and the selected learning model. In the case where the learning model is in the form of an estimation expression as in this example, the estimator 12 can calculate the estimation result by assigning the attribute included in the input estimation data to the explanatory variable of the estimation expression.

An estimation results display system 1 according to the present invention receives input of a plurality of tuples of information associating information indicating a learning model selected by the estimator 12, an estimation result derived using the learning model, and estimation data including one or more types of attributes used when selecting the learning model. The information indicating the learning model is the identification information of the learning model. The estimation results display system 1 may also receive input of other information (e.g. actual measured value) in association with the learning model, the estimation result, and the estimation data. Each estimation result input to the estimation results display system 1 according to the present invention is derived by the estimator 12 beforehand.

Figure 2:
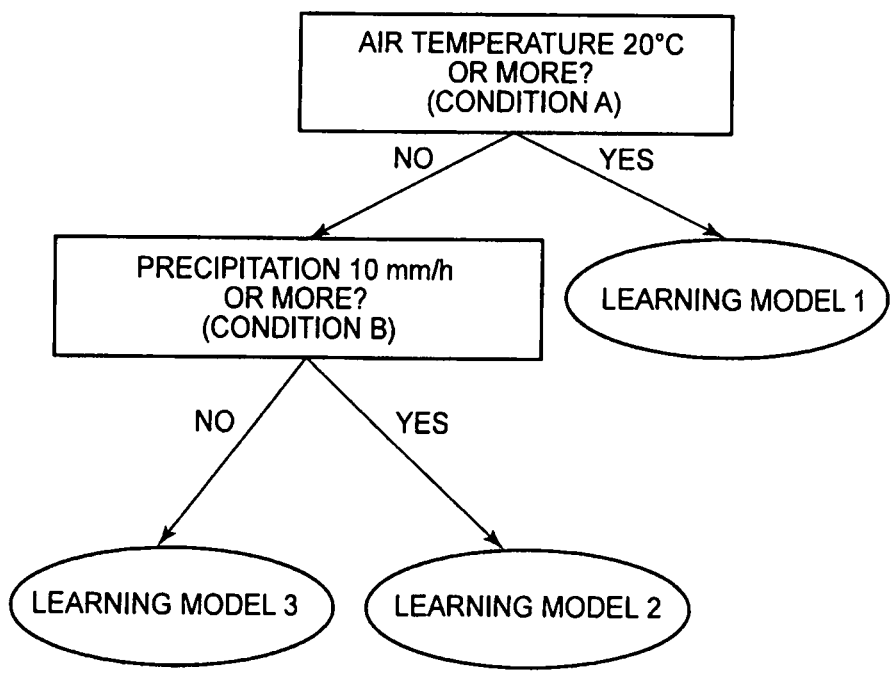
FIG. 2 is a schematic diagram depicting an example of a selection model.

The estimator 12 selects a learning model corresponding to estimation data. The learner 11 accordingly generates a model (hereafter referred to as "selection model") for selecting a learning model corresponding to estimation data. FIG. 2 is a schematic diagram depicting an example of the selection model. In the example depicted in FIG. 2, the selection model is a tree structure model in which each leaf node is a learning model and each node other than the leaf nodes is a condition for an attribute in estimation data. In the selection model depicted in FIG. 2, each node other than the leaf nodes has two child nodes. Although an example where the selection model is a tree structure model as depicted in FIG. 2 is described here, the form of the selection model is not limited to a tree structure model.

The estimator 12 is also provided with the selection model. Suppose the selection model depicted in FIG. 2 is provided to the estimator 12, and estimation data including the values of air temperature and precipitation is input to the estimator 12. Starting at the root node of the selection model, the estimator 12 advances through nodes while repeatedly selecting one of two child nodes depending on whether or not any of the attributes in the estimation data satisfies the condition indicated by the node. When the estimator 12 reaches a leaf node, the estimator 12 selects a learning model indicated by the leaf node. The estimator 12 then derives an estimation result using the learning model and the estimation data. Although the above describes an example where the estimation data including the values of air temperature and precipitation is input, the estimation data may include any attribute not set as a condition in the selection model.

In the example depicted in FIG. 2, only the condition "air temperature is 20° C. or more" is determined in the case of selecting a learning model 1, and the condition "air temperature is 20° C. or more" and the condition "precipitation is 10 mm/h or more" are determined in the case of selecting a learning model 2 or 3.

The estimation results display system 1 according to the present invention also receives input of the selection model used when the estimator 12 selects a learning model.

The estimator 12 is described using a specific example below, to facilitate understanding. FIG. 3 is a diagram depicting a specific example of estimation data input to the estimator 12. An estimation data set is depicted in FIG. 3. Information of each "row" in FIG. 3 is information corresponding to a tuple of estimation data. The estimation data includes one or more types of attributes. Information of each "column" in FIG. 3 is information indicating an attribute included in the estimation data. In the example depicted in FIG. 3, the estimation data includes an ID (identifier) for identifying the estimation data, an air temperature value, a precipitation value, a wind speed value, and information indicating time. Although the estimation data set is in tabular form in FIG. 3, the estimation data is not limited to the form in FIG. 3. In the example depicted in FIG. 3, the estimation data includes air temperature, precipitation, and wind speed as attributes.

The estimator 12 calculates an estimation result by, for example, assigning each attribute value included in the estimation data to an explanatory variable of an estimation expression.

An example of the operation of the estimator 12 is described below, based on the estimation data depicted in FIG. 3 and the selection model depicted in FIG. 2. The estimator 12 receives input of the estimation data set depicted in FIG. 3. The estimator 12 receives input of the estimation data identified by ID=1 in FIG. 3. The estimator 12 references to the selection model in FIG. 2. In the estimation data identified by ID=1, the air temperature value is 21.1° C. The estimator 12 accordingly selects the learning model 1 as the learning model corresponding to the estimation data identified by ID=1, using the selection model in FIG. 2. Likewise, the estimator 12 receives input of the estimation data identified by ID=2 in FIG. 3. In the estimation data identified by ID=2, the air temperature value is 20.5° C. The estimator 12 accordingly selects the learning model 1 as the learning model corresponding to the estimation data identified by ID=2, using the selection model in FIG. 2. Likewise, the estimator 12 receives input of the estimation data identified by ID=3 in FIG. 3. In the estimation data identified by ID=3, the air temperature value is 19.8° C., and the precipitation is 0.1 mm/h. The estimator 12 accordingly selects the learning model 3 as the learning model corresponding to the estimation data identified by ID=3, using the selection model in FIG. 2.

The estimator 12 derives an estimation result using the estimation data and the selected learning model. In detail, the estimator 12 calculates an estimated value by assigning the estimation data identified by ID=1 to the estimation expression corresponding to the learning model 1. Likewise, the estimator 12 calculates an estimated value by assigning the estimation data identified by ID=2 to the estimation expression corresponding to the learning model 1. Likewise, the estimator 12 calculates an estimated value by assigning the estimation data identified by ID=3 to the estimation expression corresponding to the learning model 3. In other words, for example for a set of estimation data continuous in chronological order (i.e. a series of estimation data in chronological order), the estimator 12 selects a learning model to be applied to the estimation data based on the property of the estimation data and the selection model. The property of the estimation data is, for example, each attribute value included in the estimation data.

FIG. 4 is a diagram depicting a specific example of estimation result data which is information output by the estimator 12. An estimation result data set is depicted in FIG. 4. Information of each "row" in FIG. 4 is information corresponding to a tuple of estimation result data. As depicted in FIG. 4, the estimation result data is, for example, information associating an estimated value, information indicating a learning model used when deriving the estimated value, and estimation data used when selecting the learning model. The estimation result data may include other information, as depicted in FIG. 4. In the example depicted in FIG. 4, the estimation result data also includes an identifier for identifying the estimation result data, the time information of the estimation data, etc. The estimation data includes one or more types of attributes, as mentioned above.

The estimation result (i.e. clean water usage estimated value 4.3 m$^3$) identified by ID=a1 in FIG. 4 is the estimated value calculated by assigning the estimation data identified by ID=1 to the estimation expression corresponding to the learning model 1. Likewise, the estimation result (i.e. clean water usage estimated value 4.0 m$^3$) identified by ID=a2 in FIG. 4 is the estimated value calculated by assigning the estimation data identified by ID=2 to the estimation expression corresponding to the learning model 1. Likewise, the estimation result (i.e. clean water usage estimated value 4.7 m$^3$) identified by ID=a3 in FIG. 4 is the estimated value calculated by assigning the estimation data identified by ID=3 to the estimation expression corresponding to the learning model 3. Thus, the estimation result data set is, for example, information indicating a series of estimation results continuous in chronological order. This completes the description of the operation of the estimator 12 using a specific example.

An example of the learner 11 as depicted in FIG. 2 is disclosed in the following reference literature.

[Reference Literature] the specification of US Patent Application Publication No. 2014/0222741 A1

In some cases, the aforementioned selection model is referred to as "learning model" and a model for deriving an estimation result, such as an estimation expression, as "component". In the following exemplary embodiments, however, a model (e.g. estimation expression) for deriving an estimation result is referred to as "learning model", and a model for selecting a learning model as "selection model". While the selection model itself is a learning result in the technique disclosed in the reference literature, the selection model may be a learning result or information generated manually in the exemplary embodiments of the present invention.

Exemplary Embodiment 1

Figure 5:
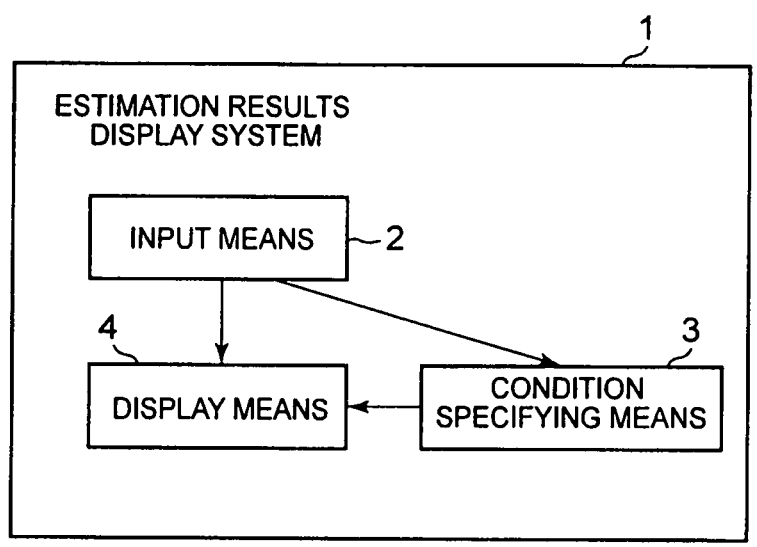
FIG. 5 is a block diagram depicting an example of the structure of an estimation results display system in Exemplary Embodiment 1 of the present invention.

FIG. 5 is a block diagram depicting an example of the structure of an estimation results display system in Exemplary Embodiment 1 of the present invention. An estimation results display system 1 in this exemplary embodiment includes input means 2, condition specifying means 3, and display means 4.

The input means 2 receives input of a plurality of tuples of information (estimation result data) associating information indicating a learning model selected by the estimator 12 depending on a determination result of whether or not one or more types of attributes in estimation data satisfy one or more types of conditions, an estimation result derived using the learning model, the estimation data, and an actual measured value. In other words, the input means 2 receives an estimation result data set. An example where the estimation result is calculated as a value is described here. Hence, the estimation result may also be referred to as "estimated value".

The input means 2 also receives input of a selection model used when the estimator 12 selects the learning model, and display data of the selection model. The estimation results display system 1 may store the selection model and display data of the selection model received once, in a storage device (not depicted in FIG. 5). The display data of the selection model is data for displaying the selection model in a mode understandable by persons. In this exemplary embodiment, display data of a tree structure in which each leaf node is a learning model and each node other than the leaf nodes is a condition for an attribute in estimation data as depicted in FIG. 2 is input as the display data of the selection model. Each node other than the leaf nodes has two child nodes, as mentioned above.

The input means 2 sends, for each tuple (i.e. estimation result data) of information indicating a learning model, an estimation result, an actual measured value, and estimation data, the information indicating the learning model, the estimation result, and the actual measured value to the display means 4, and the estimation data to the condition specifying means 3.

The estimation data in one tuple of estimation result data includes one or more types of attributes. The same applies to the other exemplary embodiments.

The input means 2 is, for example, an input device or input interface for inputting information.

The condition specifying means 3 specifies, using one or more types of attributes in the received estimation data and the selection model, each condition subjected to determination of whether or not satisfied by the attribute when the estimator 12 selects the learning model. Starting at the root node of the selection model, the condition specifying means 3 advances through nodes while repeatedly selecting one of two child nodes depending on whether or not the attribute satisfies the condition indicated by the node. The condition specifying means 3 then specifies the condition corresponding to each node passed until a leaf node is reached. The condition specifying means 3 sends the specified condition to the display means 4.

Alternatively, the condition subjected to determination of whether or not satisfied by the attribute when the estimator 12 selects the learning model may be input to the input means 12, as an attribute included in the estimation result data.

The display means 4 displays together the estimation result, the information indicating the learning model, and the condition subjected to determination of whether or not satisfied by the attribute in the estimation data when selecting the learning model. The display mode differs between exemplary embodiments.

In Exemplary Embodiment 1, the display means 4 displays a scatter graph representing the estimation result by a symbol. Here, the display means 4 changes the type of the symbol depending on the learning model, and represents, on the symbol, the condition subjected to determination of whether or not satisfied by the attribute when selecting the learning model. An example of display by the display means 4 is described in detail below.

The symbol is also referred to as "marker".

Figure 6:
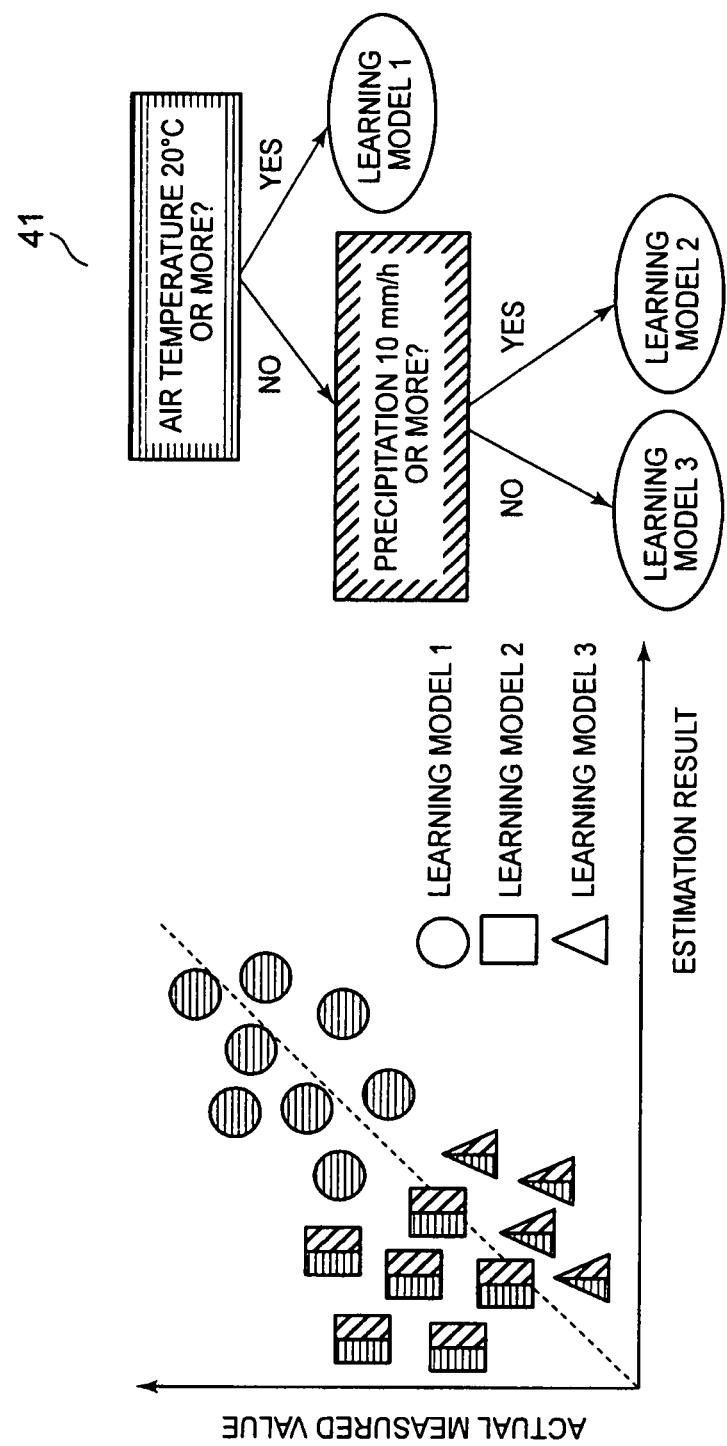
FIG. 6 is a schematic diagram depicting an example of a graph displayed by display means in Exemplary Embodiment 1.

FIG. 6 is a schematic diagram depicting an example of the graph displayed by the display means 4 in Exemplary Embodiment 1. In addition to the scatter graph, the display means 4 displays a graph 41 of a tree structure (hereafter referred to as "tree structure graph 41") representing the selection model based on the display data of the selection model. In the tree structure graph 41, the display means 4 displays each node corresponding to a condition in a separate color or pattern (see FIG. 6). Thus, each individual condition in the selection model is associated with a color or pattern.

The display means 4 displays a scatter graph representing each estimation result by a symbol. The scatter graph depicted in FIG. 6 has an axis corresponding to the estimation result and an axis corresponding to the actual measured value. FIG. 6 depicts an example where the axis corresponding to the estimation result is the horizontal axis and the axis corresponding to the actual measured value is the vertical axis.

The display means 4 places the symbol representing each estimation result in the scatter graph so that the estimation result is a coordinate in the horizontal axis direction and the actual measured value corresponding to the estimation result is a coordinate in the vertical axis direction. Moreover, the display means 4 changes the type of the symbol representing the estimation result, depending on the learning model corresponding to the estimation result. FIG. 6 depicts an example where the symbol representing an estimation result derived using the learning model 1 is a circle, the symbol representing an estimation result derived using the learning model 2 is a square, and the symbol representing an estimation result derived using the learning model 3 is a triangle. In the case where there are more types of learning models, too, the display means 4 changes the type of the symbol depending on the learning model. In the case where many types of learning models are used, however, the display means 4 need not necessarily change the symbol for every learning model. For example, the display means 4 may group the learning models and, for each learning model group, change the type of the symbol representing an estimation result derived from any learning model in the learning model group. The display means 4 may also change the type of the symbol representing an estimation result derived from a specific learning model from among a plurality of learning models, from the other types of symbols. The same applies to the other exemplary embodiments.

Moreover, the display means 4 represents, on each symbol in the scatter graph, the condition subjected to determination of whether or not satisfied by the attribute in the estimation data when selecting the learning model. As mentioned above, each node corresponding to a condition is displayed in a separate color or pattern on the tree structure graph 41. The display means 4 represents each symbol in a color or pattern corresponding to a condition specified by the condition specifying means 3 using the estimation data corresponding to the estimation result represented by the symbol (i.e. condition subjected to determination of whether or not satisfied by the attribute in the estimation data when selecting the learning model by which the estimation result is derived). A plurality of conditions may be specified for one symbol. In such a case, the display means 4 represents the symbol in the respective colors or patterns corresponding to the plurality of conditions.

Consider the case where the selection model represented by the tree structure graph 41 is used. In the case of selecting the learning model 1, only the condition "air temperature is 20° C. or more" (hereafter referred to as "condition A") is determined. In the case of selecting the learning model 2 or 3, the condition A and the condition "precipitation is 10 mm/h or more" (hereafter referred to as "condition B") are determined. In the example depicted in FIG. 6, the condition A is associated with a horizontal line pattern, and the condition B is associated with a diagonal line pattern (see the tree structure graph 41 in FIG. 6). Accordingly, the display means 4 sets the symbol representing the estimation result corresponding to the learning model 1 as a circle in the horizontal line pattern. The display means 4 sets the symbol representing the estimation result corresponding to the learning model 2 as a square in the combination of the horizontal line pattern and the diagonal line pattern. The display means 4 sets the symbol representing the estimation result corresponding to the learning model 3 as a triangle in the combination of the horizontal line pattern and the diagonal line pattern.

Although FIG. 6 depicts an example where the display means 4 changes the shape of the symbol depending on the learning model and changes the color or pattern of the symbol depending on the condition, the display means 4 may change the color or pattern of the symbol depending on the learning model and change the shape of the symbol depending on the condition.

The condition specifying means 3 and the display means 4 are, for example, realized by a CPU of a computer including a display device. In this case, the CPU may read an estimation results display program from a program recording medium such as a program storage device (not depicted in FIG. 5) in the computer, and operate as the condition specifying means 3 and the display means 4 according to the estimation results display program. The part of the display means 4 that determines the graph and causes the display device to display the graph is realized by the CPU. The part of the display means 4 that performs actual display is realized by the display device. The same applies to the exemplary embodiments described later.

The estimation results display system 1 may have a structure in which two or more physically separate devices are connected wiredly or wirelessly. The same applies to the exemplary embodiments described later.

Figure 7:
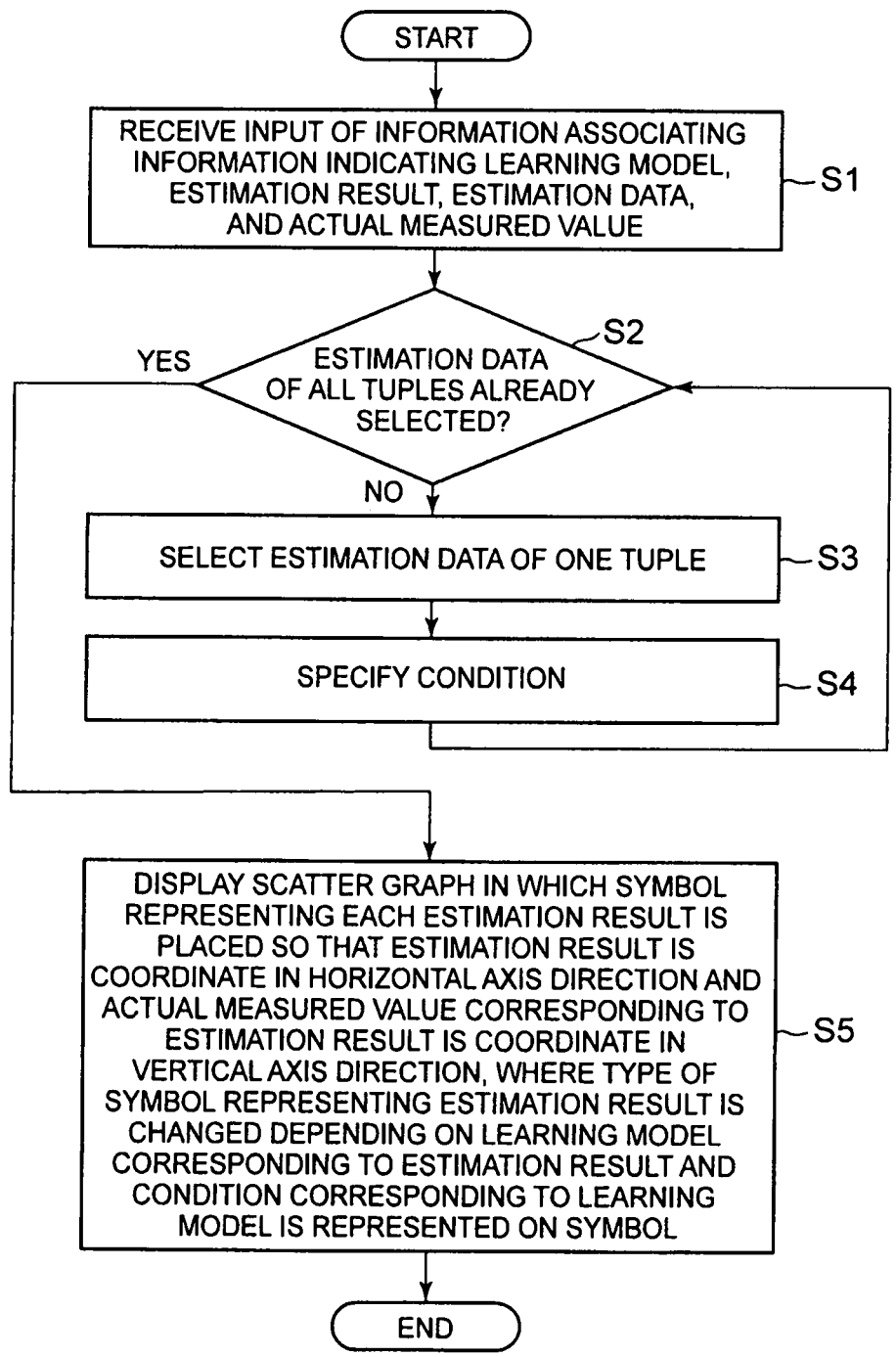
FIG. 7 is a flowchart depicting an example of a process in Exemplary Embodiment 1.

A process is described below. FIG. 7 is a flowchart depicting an example of the process in Exemplary Embodiment 1.

First, the input means 2 receives input of a plurality of tuples of information associating information indicating a learning model, an estimation result derived using the learning model, estimation data used when selecting the learning model, and an actual measured value (step S1). The input means 2 sends, for each tuple, the information indicating the learning model, the estimation result, and the actual measured value to the display means 4, and the estimation data to the condition specifying means 3.

In step S1, the input means 2 also receives input of a selection model and display data of the selection model. The estimation results display system 1 stores the selection model and the display data of the selection model in a storage device (not depicted in FIG. 5).

Next, the condition specifying means 3 determines whether or not the estimation data of all tuples has already been selected (step S2). In the case where there is any tuple whose estimation data has not been selected (step S2: No), the condition specifying means 3 selects the estimation data in the tuple (step S3).

The condition specifying means 3 specifies, using the estimation data selected in step S3 and the selection model, a condition subjected to determination of whether or not satisfied by the attribute in the estimation data when the estimator 12 selects the learning model corresponding to the estimation data (step S4). As mentioned earlier, starting at the root node of the selection model, the condition specifying means 3 advances through nodes while repeatedly selecting one of two child nodes depending on whether or not the attribute in the estimation data satisfies the condition indicated by the node. The condition specifying means 3 then specifies the condition corresponding to each node passed until a leaf node is reached.

For example, suppose estimation data including the attributes "air temperature 18° C." and "precipitation 15 mm/h" is selected in step S3. Also suppose the selection model depicted in FIG. 2 is input. The condition specifying means 3 advances through nodes starting at the root node depicted in FIG. 2. The root node corresponds to the condition A, and the condition specifying means 3 determines that "air temperature 18° C." does not satisfy the condition A. The condition specifying means 3 accordingly advances from the root node to the node corresponding to the condition B. The condition specifying means 3 then determines that "precipitation 15 mm/h" satisfies the condition B, and reaches the leaf node corresponding to the learning model 2. Thus, the condition specifying means 3 specifies the conditions A and B in this example.

The condition specifying means 3 sends the specified condition(s) to the display means 4.

After step S4, the process returns to step S2.

In the case where the estimation data of all tuples has already been selected (step S2: Yes), the display means 4 displays a scatter graph in which the symbol representing each estimation result is placed so that the estimation result is a coordinate in the horizontal axis direction and the actual measured value corresponding to the estimation result is a coordinate in the vertical axis direction. Here, the display means 4 changes the type of the symbol representing the estimation result depending on the learning model corresponding to the estimation result, and represents the condition corresponding to the learning model on the symbol (step S5).

In step S5, the display means 4 displays the tree structure graph 41 based on the display data of the selection model, together with the scatter graph. Here, the display means 4 displays each node corresponding to a condition in the tree structure graph 41 in a color or pattern corresponding to the condition.

For example, the display means 4 displays the scatter graph and the tree structure graph 41 depicted in FIG. 6, in step S5.

According to this exemplary embodiment, the display means 4 represents the symbol in the color or pattern corresponding to the condition subjected to determination of whether or not satisfied by the attribute in the estimation data when selecting the learning model. This enables the observer of the graph (hereafter simply referred to as "observer") to recognize which condition is subjected to determination of whether or not satisfied by the attribute when selecting the learning model used for deriving the estimation result. In other words, the observer can recognize the condition which is a factor leading to the selection of the learning model. Hence, for example in the case where the accuracy of an estimation result derived using a learning model is low, the selection model can be reviewed based on the factor leading to the selection of the learning model.

Moreover, the display means 4 changes the type of the symbol representing the estimation result depending on the learning model corresponding to the estimation result. This enables the observer to recognize which learning model is selected when deriving the estimation result.

In the example depicted in FIG. 6, the axis corresponding to the estimation result is the horizontal axis and the axis corresponding to the actual measured value is the vertical axis. Let x be the estimation result, and y be the actual measured value. When the symbol is closer to the straight line y=x (the dashed straight line in FIG. 6), the estimation accuracy of the learning model is higher. This means that, if a symbol of a specific shape is away from y=x, the accuracy of the learning model selected when deriving the estimation result represented by the symbol is low. Thus, in the case where a learning model with low estimation accuracy is selected, the observer can recognize the selected learning model with low estimation accuracy.

In the information input to the input means 2, the learning model corresponding to the estimation data may not necessarily be the learning model selected by the estimator 12. For example, the learning model corresponding to the estimation data may be manually selected by an analyzer. In this case, for example, the estimation result and the information indicating the learning model used when deriving the estimation result may be associated manually. The same applies to the other exemplary embodiments.

Exemplary Embodiment 2

Figure 8:
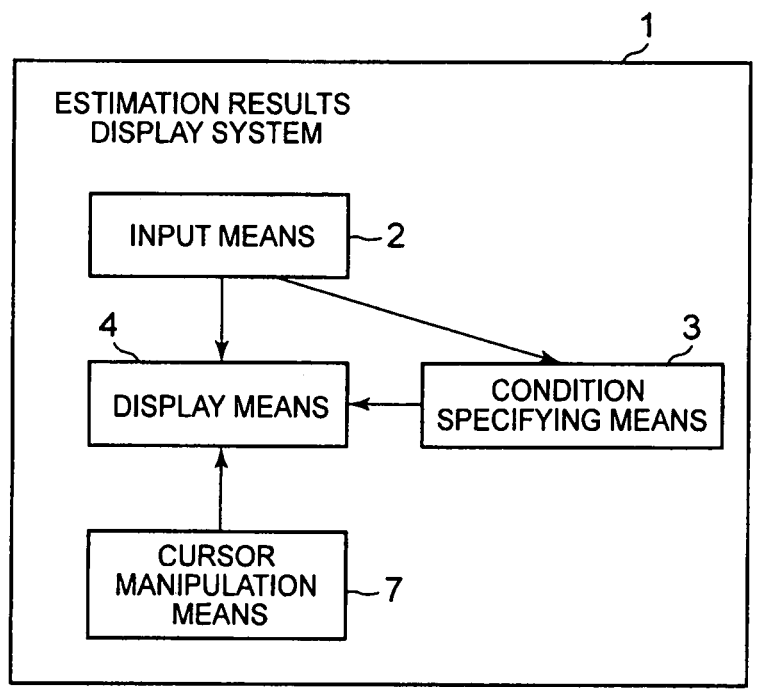
FIG. 8 is a block diagram depicting an example of the structure of an estimation results display system in Exemplary Embodiment 2 of the present invention.

FIG. 8 is a block diagram depicting an example of the structure of an estimation results display system in Exemplary Embodiment 2 of the present invention. An estimation results display system 1 in Exemplary Embodiment 2 includes input means 2, condition specifying means 3, display means 4, and cursor manipulation means 7. The description of the same matters as in Exemplary Embodiment 1 is omitted as appropriate.

The input means 2 is the same as the input means in Exemplary Embodiment 1. The input means 2 receives input of a plurality of tuples of information (estimation result data) associating information indicating a learning model selected by the estimator 12 depending on a determination result of whether or not one or more types of attributes in estimation data satisfy one or more types of conditions, an estimation result derived using the learning model, the estimation data, and an actual measured value, as in Exemplary Embodiment 1. An example where the estimation result is calculated as a value is described here. Hence, the estimation result may also be referred to as "estimated value".

The input means 2 also receives input of a selection model used when the estimator 12 selects the learning model. The estimation results display system 1 may store the selection model received once, in a storage device (not depicted in FIG. 8). In this exemplary embodiment, the input means 2 need not receive display data of the selection model because the tree structure graph 41 (see FIG. 6) does not need to be displayed.

The condition specifying means 3 is the same as the condition specifying means 3 in Exemplary Embodiment 1. In Exemplary Embodiment 2, however, the condition specifying means 3 preferably not only specifies the condition subjected to determination of whether or not satisfied by the attribute in the estimation data when selecting the learning model, but also determines whether or not the attribute satisfies the condition. The following describes an example where the condition specifying means 3 also determines whether or not the attribute satisfies the specified condition.

The cursor manipulation means 7 is a device used by the observer to manipulate a cursor on the display screen of the graph. In detail, the cursor manipulation means 7 is a pointing device such as a mouse, a touchpad, a joystick, or a trackball.

Figure 9:
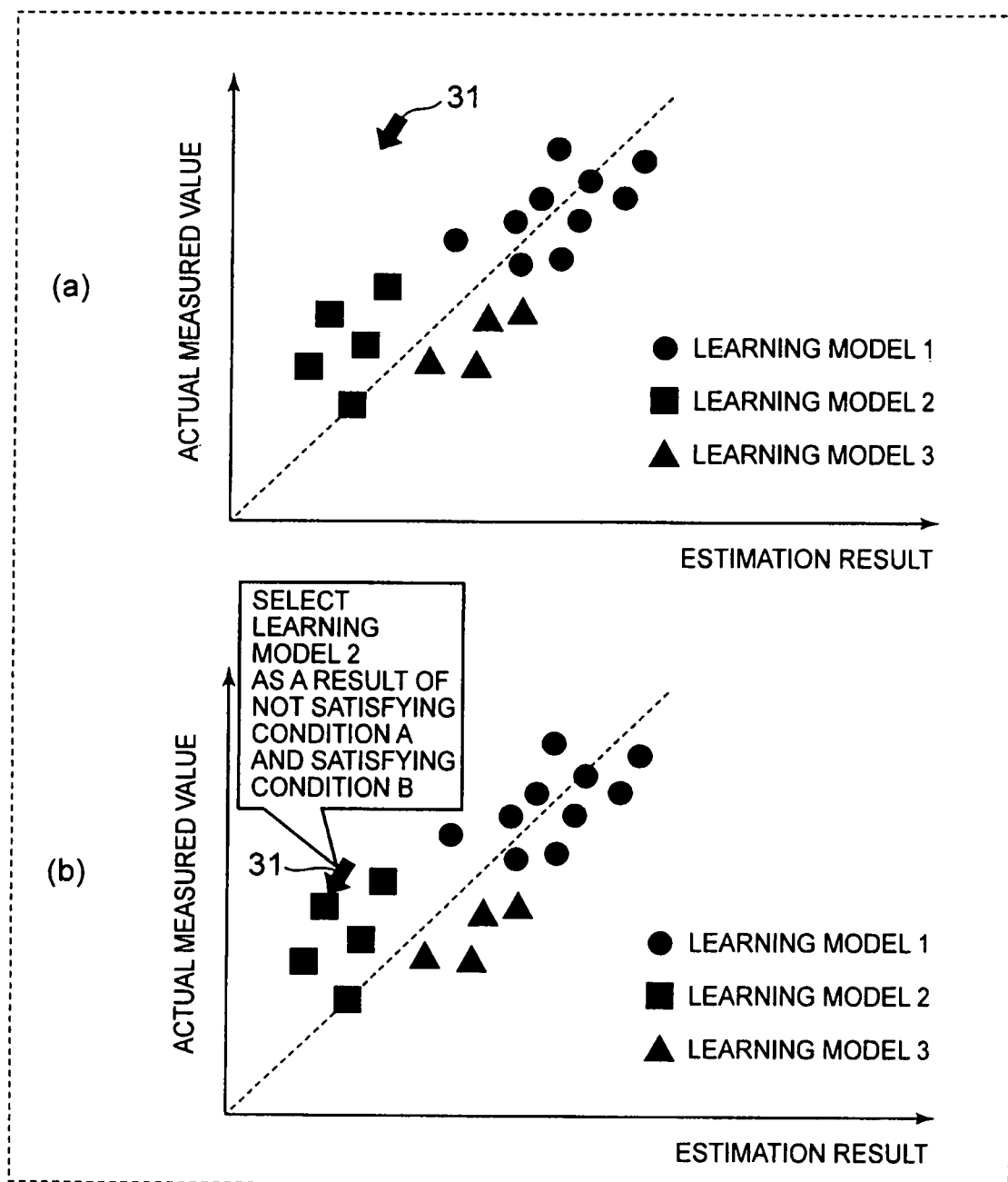
FIG. 9 is a schematic diagram depicting an example of a graph displayed by display means in Exemplary Embodiment 2.

In Exemplary Embodiment 2, the display means 4 displays a scatter graph representing each estimation result by a symbol. Here, the display means 4 changes the type of the symbol depending on the learning model. FIG. 9 is a schematic diagram depicting an example of the graph (scatter graph in this exemplary embodiment) displayed by the display means 4 in Exemplary Embodiment 2. FIG. 9(*a*) depicts the displayed scatter graph in its initial state. FIG. 9(*b*) depicts the graph in the case where a symbol representing an estimation result is pointed and clicked.

The display means 4 displays, for example, the scatter graph in which the axis corresponding to the estimation result is the horizontal axis and the axis corresponding to the actual measured value is the vertical axis. Here, the display means 4 places the symbol representing each estimation result in the scatter graph so that the estimation result is a coordinate in the horizontal axis direction and the actual measured value corresponding to the estimation result is a coordinate in the vertical axis direction. Moreover, the display means 4 changes the type of the symbol representing the estimation result, depending on the learning model corresponding to the estimation result. This is the same as in Exemplary Embodiment 1.

Moreover, the display means 4 displays a cursor 31 together with the scatter graph. FIG. 9(*a*) depicts the initial state where the cursor 31 is displayed together with the scatter graph.

The display means 4 changes the display position of the cursor 31 according to the movement of the cursor manipulation means 7 manipulated by the observer. When any of the symbols in the scatter graph is pointed and clicked, the display means 4 displays, on the scatter graph, the condition subjected to determination of whether or not satisfied by the attribute in the estimation data when selecting the learning model corresponding to the estimation result represented by the symbol. FIG. 9(*b*) depicts this display state of the scatter graph. This exemplary embodiment describes an example where the display means 4 also displays the determination result of whether or not the attribute satisfies the condition.

Although the following describes an example where, when a symbol is pointed and clicked, the display means 4 displays the condition subjected to determination of whether or not satisfied by the attribute in the estimation data when selecting the learning model corresponding to the estimation result represented by the symbol, the display means 4 may, when a symbol is in an on cursor state, display the condition subjected to determination of whether or not satisfied by the attribute in the estimation data when selecting the learning model corresponding to the estimation result represented by the symbol. The same applies to the other exemplary embodiments.

The expression "a symbol is pointed and clicked" means that the cursor 31 is placed over the symbol and clicking is performed. The expression "a symbol is in an on cursor state" means that the cursor 31 is placed over the symbol.

Figure 10:
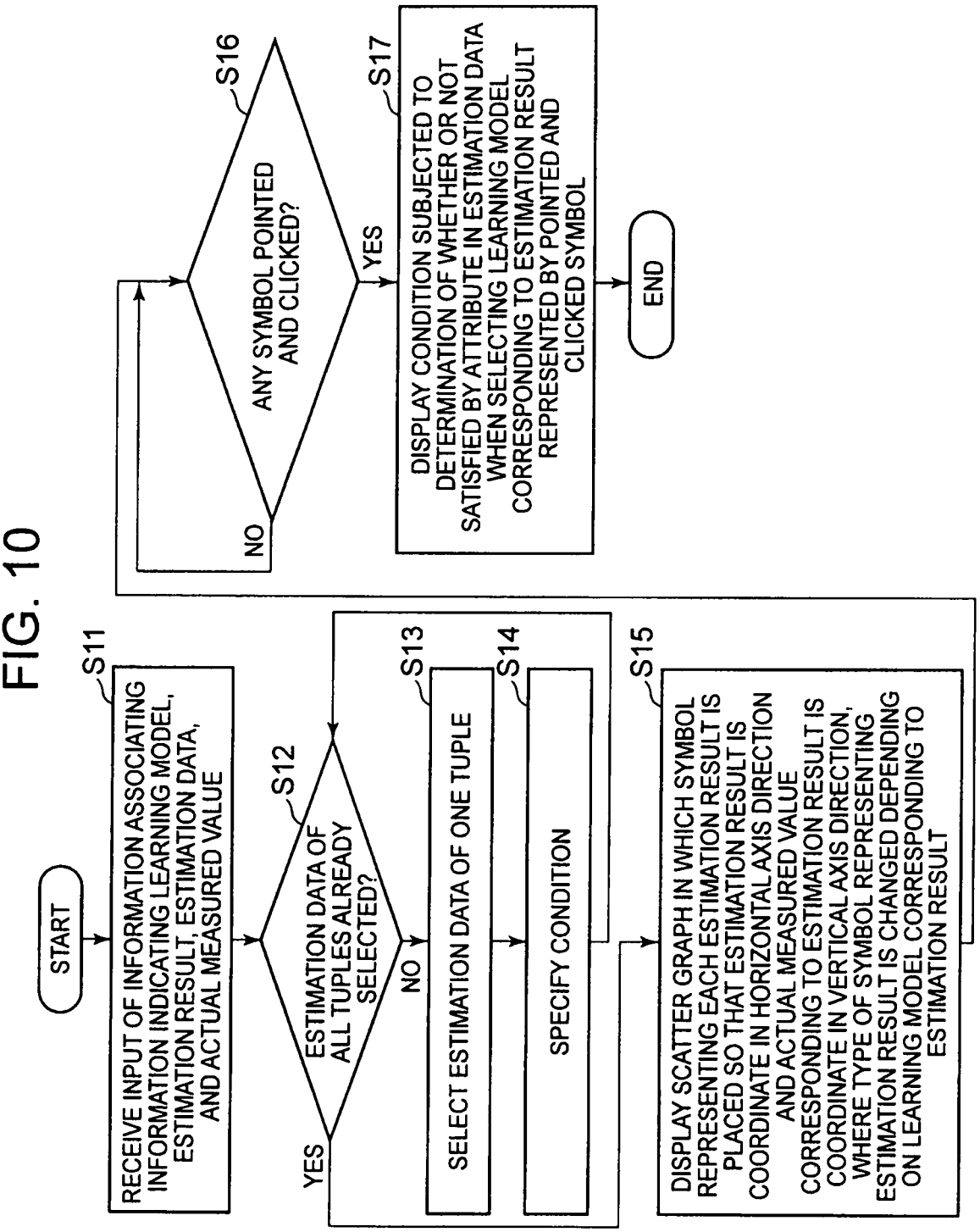
FIG. 10 is a flowchart depicting an example of a process in Exemplary Embodiment 2.

A process is described below. FIG. 10 is a flowchart depicting an example of the process in Exemplary Embodiment 2.

The input means 2 receives input of a plurality of tuples of information associating information indicating a learning model, an estimation result derived using the learning model, estimation data used when selecting the learning model, and an actual measured value (step S11). The input means 2 sends, for each tuple, the information indicating the learning model, the estimation result, and the actual measured value to the display means 4, and the estimation data to the condition specifying means 3.

In step S1, the input means 2 also receives input of a selection model. The estimation results display system 1 stores the selection model in a storage device (not depicted in FIG. 8).

Next, the condition specifying means 3 determines whether or not the estimation data of all tuples has already been selected (step S12). In the case where there is any tuple whose estimation data has not been selected (step S12: No), the condition specifying means 3 selects the estimation data in the tuple (step S13). Steps S12 and S13 are the same as steps S2 and S3 in Exemplary Embodiment 1.

The condition specifying means 3 specifies, using the estimation data selected in step S13 and the selection model, a condition subjected to determination of whether or not satisfied by the attribute in the estimation data when the estimator 12 selects the learning model corresponding to the estimation data (step S14). In step S14, the condition specifying means 3 also determines whether or not the attribute satisfies the specified condition. The operation in step S14 is the same as the operation in step S4 in Exemplary Embodiment 1. In this exemplary embodiment, however, the condition specifying means 3 sends the specified condition and the determination result of whether or not the attribute satisfies the specified condition, to the display means 4.

After step S14, the process returns to step S12.

In the case where the estimation data of all tuples has already been selected (step S12: Yes), the display means 4 displays a scatter graph in which the symbol representing each estimation result is placed so that the estimation result is a coordinate in the horizontal axis direction and the actual measured value corresponding to the estimation result is a coordinate in the vertical axis direction. Here, the display means 4 changes the type of the symbol representing the estimation result depending on the learning model corresponding to the estimation result (step S15). The display means 4 also displays the cursor 31. In step S15, the screen depicted in FIG. 9(*a*) is displayed.

The display means 4 then determines whether or not any symbol in the scatter graph is pointed and clicked (step S16). If no symbol is pointed and clicked (step S16: No), the display means 4 repeats the determination in step S16.

In the case where any symbol is pointed and clicked (step S16: Yes), the display means 4 displays the condition subjected to determination of whether or not satisfied by the attribute in the estimation data when selecting the learning model corresponding to the estimation result represented by the symbol, and the determination result of whether or not the attribute satisfies the condition (step S17). In step S17, the screen depicted in FIG. 9(b) is displayed. In the example depicted in FIG. 9(b), the display means 4 displays information "select learning model 2 as a result of not satisfying condition A and satisfying condition B". From such display, the observer can recognize that the conditions A and B are subjected to determination and the attribute in the estimation data does not satisfy the condition A but satisfies the condition B.

After step S17, in the case where the cursor 31 moves away from the symbol, the display means 4 may repeat the operation from step S16 onward.

Exemplary Embodiment 2 describes an example where the condition specifying means 3 executes steps S13 and S14 for each tuple of associated information before the scatter graph is displayed. Alternatively, when a symbol is pointed and clicked, the condition specifying means 3 may select the estimation data corresponding to the estimation result represented by the symbol and execute the same process as in step S14, after which the display means 4 executes step S17. The same applies to the other exemplary embodiments in which information is displayed in the case where a symbol is pointed and clicked or in the case where a symbol is in an on cursor state.

According to this exemplary embodiment, in the case where any symbol is pointed and clicked, the display means 4 displays the condition subjected to determination of whether or not satisfied by the attribute in the estimation data when selecting the learning model corresponding to the estimation result represented by the symbol, and the determination result of whether or not the attribute satisfies the condition. This enables the observer to recognize which condition is subjected to determination of whether or not satisfied by the attribute when selecting the learning model used for deriving the estimation result, and also recognize whether or not the attribute satisfies the condition. Thus, the observer can recognize the condition which is a factor leading to the selection of the learning model, as in Exemplary Embodiment 1.

Moreover, in this exemplary embodiment, too, the observer can recognize which learning model is selected when deriving the estimation result. Further, in the case where a learning model with low estimation accuracy is selected, the observer can recognize the selected learning model with low estimation accuracy.

Exemplary Embodiment 3

An estimation results display system in Exemplary Embodiment 3 of the present invention can be depicted by the block diagram in FIG. 8, as with the estimation results display system in Exemplary Embodiment 2. Hence, Exemplary Embodiment 3 is described below with reference to FIG. 8. The description of the same matters as in Exemplary Embodiment 2 is omitted as appropriate.

The estimation results display system 1 in Exemplary Embodiment 3 includes the input means 2, the condition specifying means 3, the display means 4, and the cursor manipulation means 7 (see FIG. 8).

The information input to the input means 2 in Exemplary Embodiment 3 is the same as the information input to the input means 2 in Exemplary Embodiment 1.

The condition specifying means 3, starting at the root node of the selection model, repeatedly selects one of two child nodes depending on whether or not the attribute in the estimation data satisfies the condition indicated by the node, until a leaf node corresponding to a learning model is reached. By this process, the condition specifying means 3 specifies the path from the root node to the leaf node in the tree structure graph 41. Each node other than the leaf node in the path is a node corresponding to a condition for the attribute in the estimation data. Hence, specifying the path means specifying each condition subjected to determination of whether or not satisfied by the attribute when the estimator 12 selects the learning model corresponding to the leaf node.

The display means 4 displays a scatter graph representing each estimation result by a symbol. Here, the display means 4 changes the type of the symbol depending on the learning model. The display means 4 also displays the tree structure graph 41 (see FIG. 11), based on display data of the selection model. In Exemplary Embodiment 3, display data of a tree structure in which each leaf node is a learning model and each node other than the leaf nodes is a condition for an attribute in estimation data is input as the display data of the selection model, as in Exemplary Embodiment 1.

Figure 11:
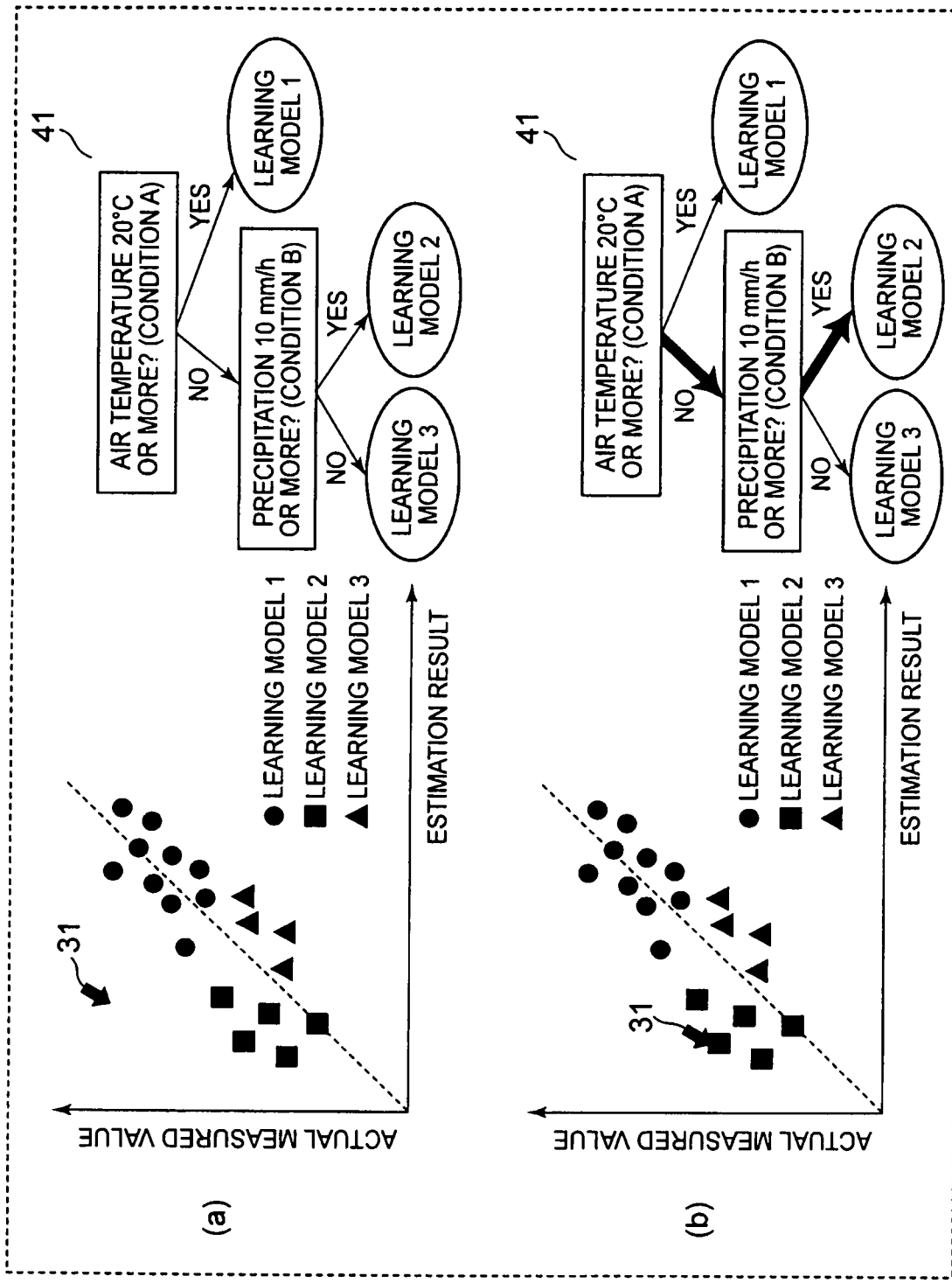
FIG. 11 is a schematic diagram depicting an example of a graph displayed by display means in Exemplary Embodiment 3.

FIG. 11 is a schematic diagram depicting an example of the graph displayed by the display means 4 in Exemplary Embodiment 3. FIG. 11(a) depicts the displayed graph in its initial state. FIG. 11(b) depicts the graph in the case where a symbol representing an estimation result is pointed and clicked.

The display means 4 displays, for example, the scatter graph in which the axis corresponding to the estimation result is the horizontal axis and the axis corresponding to the actual measured value is the vertical axis. Here, the display means 4 places the symbol representing each estimation result in the scatter graph so that the estimation result is a coordinate in the horizontal axis direction and the actual measured value corresponding to the estimation result is a coordinate in the vertical axis direction. Moreover, the display means 4 changes the type of the symbol representing the estimation result, depending on the learning model corresponding to the estimation result. This is the same as in Exemplary Embodiment 1.

The display means 4 also displays the tree structure graph 41 based on the display data of the selection model. In Exemplary Embodiment 3, the display means 4 does not need to display each node corresponding to a condition in a separate color or pattern in the tree structure graph 41 (see FIG. 11).

The display means 4 also displays the cursor 31. FIG. 11(a) depicts the initial state where the scatter graph, the tree structure graph 41, and the cursor 31 are displayed.

The display means 4 changes the display position of the cursor 31 according to the movement of the cursor manipulation means 7 manipulated by the observer. When any of the symbols in the scatter graph is pointed and clicked, the display means 4 highlights the path on the tree structure graph 41 specified by the condition specifying means 3 based on the estimation data corresponding to the estimation result represented by the symbol. FIG. 11(b) depicts this display state.

Figure 12:
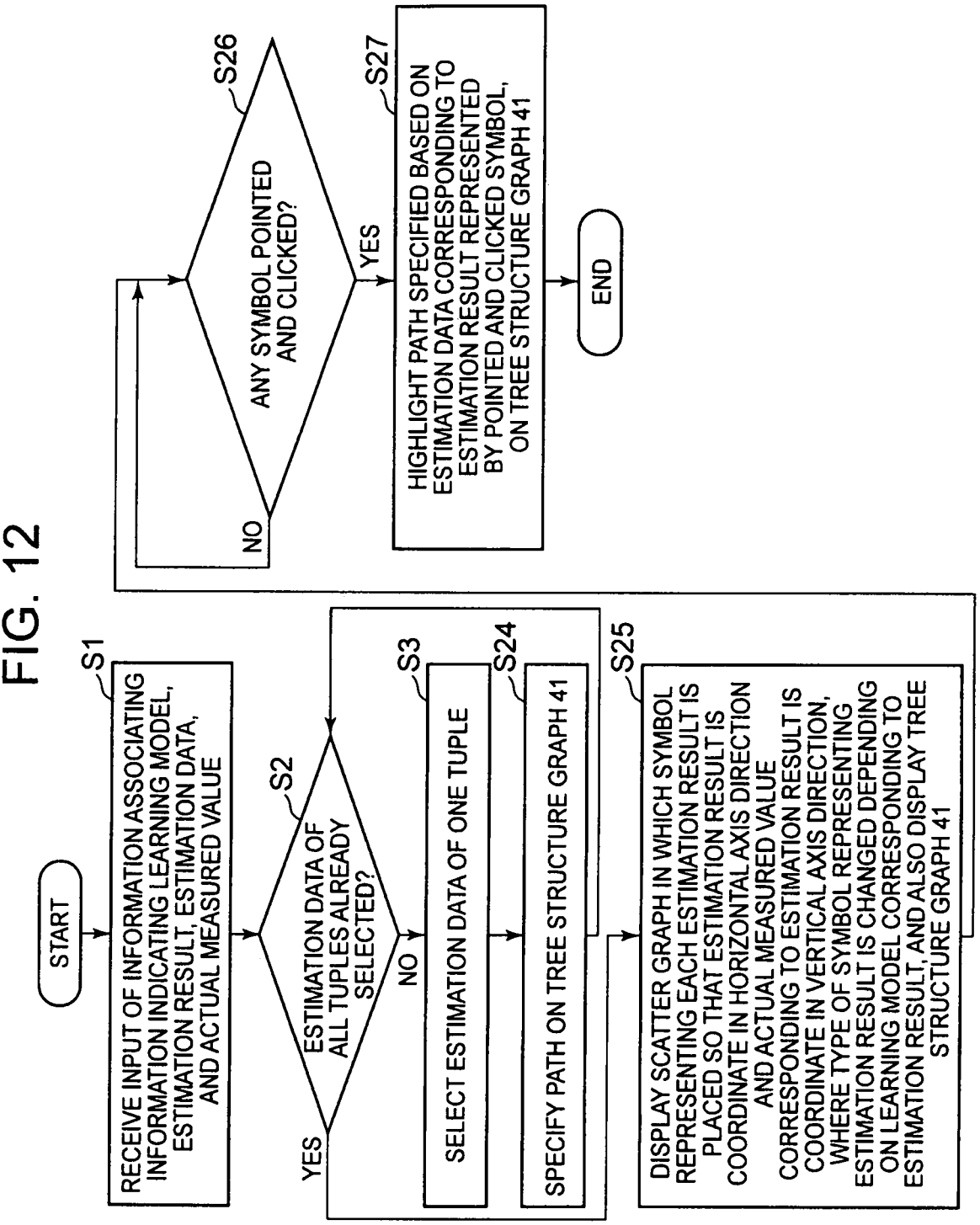
FIG. 12 is a flowchart depicting an example of a process in Exemplary Embodiment 3.

A process is described below. FIG. 12 is a flowchart depicting an example of the process in Exemplary Embodiment 3. Steps S1 to S3 are the same as steps S1 to S3 in Exemplary Embodiment 1.

After step S3, the condition specifying means 3 specifies, using the estimation data selected in step S3 and the selection model, a path on the tree structure graph 41 (step S24). The condition specifying means 3 specifies the path on the tree structure graph 41 by, starting at the root node of the selection model, repeatedly selecting one of two child nodes depending on whether or not the attribute in the estimation data satisfies the condition indicated by the node until a leaf node corresponding to a learning model is reached.

After step S14, the process returns to step S2.

In the case where the estimation data of all tuples has already been selected (step S2: Yes), the display means 4 displays a scatter graph in which the symbol representing each estimation result is placed so that the estimation result is a coordinate in the horizontal axis direction and the actual measured value corresponding to the estimation result is a coordinate in the vertical axis direction. Here, the display means 4 changes the type of the symbol representing the estimation result depending on the learning model corresponding to the estimation result. The display means 4 also displays the tree structure graph 41 based on the display data of the selection model (step S25). The display means 4 also displays the cursor 31. In step S25, the screen depicted in FIG. 11(*a*) is displayed.

The display means 4 then determines whether or not any symbol in the scatter graph is pointed and clicked (step S26). If no symbol is pointed and clicked (step S26: No), the display means 4 repeats the determination in step S26.

In the case where any symbol is pointed and clicked (step S26: Yes), the display means 4 highlights the path specified based on the estimation data corresponding to the estimation result represented by the symbol, on the tree structure graph 41 (step S27). In step S27, the screen depicted in FIG. 11(*b*) is displayed. Although the path is highlighted by boldfacing the links between the nodes in FIG. 11(*b*), the method of highlighting the path on the tree structure graph 41 is not particularly limited.

After step S27, in the case where the cursor 31 moves away from the symbol, the display means 4 may stop highlighting the path on the tree structure graph 41, and repeat the operation from step S26 onward.

In step S26, the display means 4 may determine whether or not any symbol is in an on cursor state, and advance to step S27 when any symbol is in an on cursor state.

Each node other than the leaf node in the path highlighted in step S27 is a node corresponding to a condition for the attribute in the estimation data. This means that, by highlighting the path in step S27, the display means 4 displays each condition subjected to determination of whether or not satisfied by the attribute in the estimation data when the estimator 12 selects the learning model used for deriving the estimation result. In the example depicted in FIG. 11(*b*), it can be understood that whether or not the attribute in the estimation data satisfies the condition A and whether or not the attribute in the estimation data satisfies the condition B are determined when selecting the learning model 2 used for deriving the estimation result represented by the pointed and clicked symbol. Thus, the observer can recognize which condition is subjected to determination of whether or not satisfied by the attribute when selecting the learning model used for deriving the estimation result. In other words, the observer can recognize the condition which is a factor leading to the selection of the learning model.

Moreover, in this exemplary embodiment, too, the observer can recognize which learning model is selected when deriving the estimation result. Further, in the case where a learning model with low estimation accuracy is selected, the observer can recognize the selected learning model with low estimation accuracy.

Exemplary Embodiment 4

An estimation results display system in Exemplary Embodiment 4 of the present invention can be depicted by the block diagram in FIG. 8, as with the estimation results display system in Exemplary Embodiment 2. Hence, Exemplary Embodiment 4 is described below with reference to FIG. 8.

The estimation results display system 1 in Exemplary Embodiment 4 includes the input means 2, the condition specifying means 3, the display means 4, and the cursor manipulation means 7 (see FIG. 8).

The information input to the input means 2 in Exemplary Embodiment 4 is the same as the information input to the input means 2 in Exemplary Embodiment 1. In Exemplary Embodiment 4, however, data in which conditions for attributes in estimation data are assigned to a plurality of axes and learning models corresponding to the conditions are indicated in the space defined by the axes is input as the display data of the selection model. FIG. 13 is an explanatory diagram depicting an example of the selection model displayed based on such display data of the selection model.

The selection model depicted in FIG. 13 represents the same contents as the selection model of the tree structure depicted in FIG. 2. In the example depicted in FIG. 13, conditions are assigned to two axes. In detail, the condition A (condition that air temperature is 20° C. or more) is assigned to the horizontal axis, and the condition B (condition that precipitation is 10 mm/h or more) is assigned to the vertical axis. The horizontal axis is divided into the range of satisfying the condition A (the range of 20° C. or more) and the range of not satisfying the condition A (the range of less than 20° C.). Likewise, the vertical axis is divided into the range of satisfying the condition B (the range of 10 mm/h or more) and the range of not satisfying the condition B (the range of less than 10 mm/h).

In the case where the condition A is satisfied, the learning model 2 is selected regardless of whether or not the other condition is satisfied. It is thus predetermined in the display data of the selection model that the space (region) defined by the range of the horizontal axis satisfying the condition A corresponds to the learning model 1.

In the case where the condition A is not satisfied, if the condition B is satisfied, the learning model 1 is selected. It is thus predetermined in the display data of the selection model that the space (region) defined by the range of the horizontal axis not satisfying the condition A and the range of the vertical axis satisfying the condition B corresponds to the learning model 2.

In the case where neither condition A nor B is satisfied, the learning model 3 is selected. It is thus predetermined in the display data of the selection model that the space (region) defined by the range of the horizontal axis not satisfying the condition A and the range of the vertical axis not satisfying the condition B corresponds to the learning model 3.

The diagram representing the selection model as depicted in FIG. 13 is displayed based on such display data of the selection model. The diagram depicted in FIG. 13 is hereafter referred to as "selection model diagram".

Although one condition is assigned to each of the horizontal axis and vertical axis in the example depicted in FIG. 13, a plurality of conditions may be assigned to one axis. Moreover, the number of axes in the selection model diagram may be 3.

The condition specifying means 3 specifies the condition subjected to determination of whether or not satisfied by the attribute in the estimation data selecting the learning model, and determines whether or not the attribute satisfies the condition.

The display means 4 displays a scatter graph representing each estimation result by a symbol. Here, the display means 4 changes the type of the symbol depending on the learning model. The display means 4 also displays the selection model diagram based on display data of the selection model.

Figure 14:
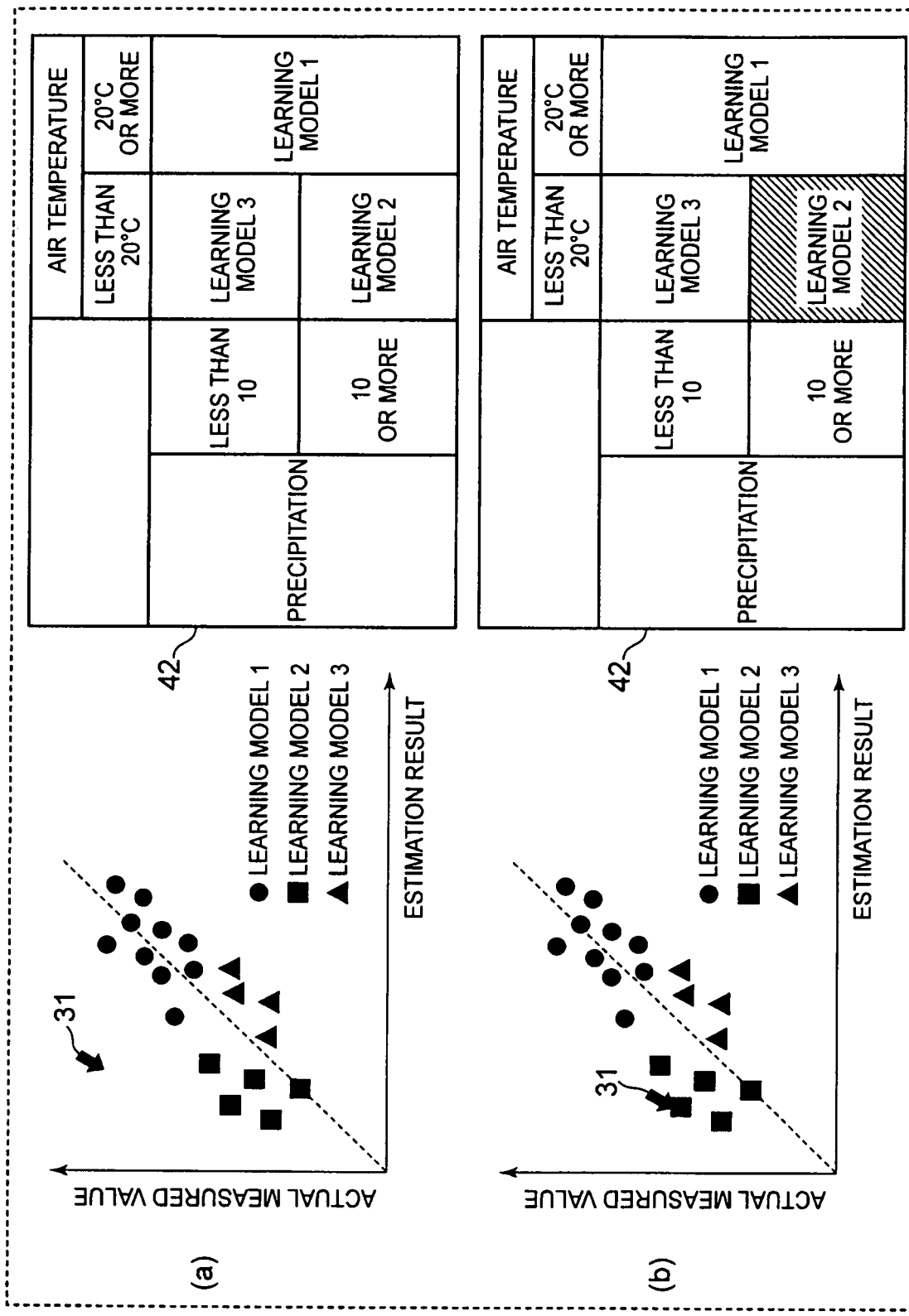
FIG. 14 is a schematic diagram depicting an example of a graph displayed by display means in Exemplary Embodiment 4.

FIG. 14 is a schematic diagram depicting an example of the graph displayed by the display means 4 in Exemplary Embodiment 4. FIG. 14(a) depicts the displayed graph in its initial state. FIG. 14(b) depicts the graph in the case where a symbol representing an estimation result is pointed and clicked.

The display means 4 displays, for example, the scatter graph in which the axis corresponding to the estimation result is the horizontal axis and the axis corresponding to the actual measured value is the vertical axis. Here, the display means 4 places the symbol representing each estimation result in the scatter graph so that the estimation result is a coordinate in the horizontal axis direction and the actual measured value corresponding to the estimation result is a coordinate in the vertical axis direction. Moreover, the display means 4 changes the type of the symbol representing the estimation result, depending on the learning model corresponding to the estimation result. This is the same as in Exemplary Embodiment 1.

The display means 4 also displays a selection model diagram 42 based on the display data of the selection model.

The display means 4 also displays the cursor 31. FIG. 14(a) depicts the initial state where the scatter graph, the selection model diagram 42, and the cursor 31 are displayed.

The display means 4 changes the display position of the cursor 31 according to the movement of the cursor manipulation means 7 manipulated by the observer. When any of the symbols in the scatter graph is pointed and clicked, the display means 4 highlights the region in the selection model diagram 42 determined by the result (the condition, and whether or not the attribute in the estimation data satisfies the condition) of determination by the condition specifying means 3 based on the estimation data corresponding to the estimation result represented by the symbol. FIG. 14(b) depicts this display state.

Figure 15:
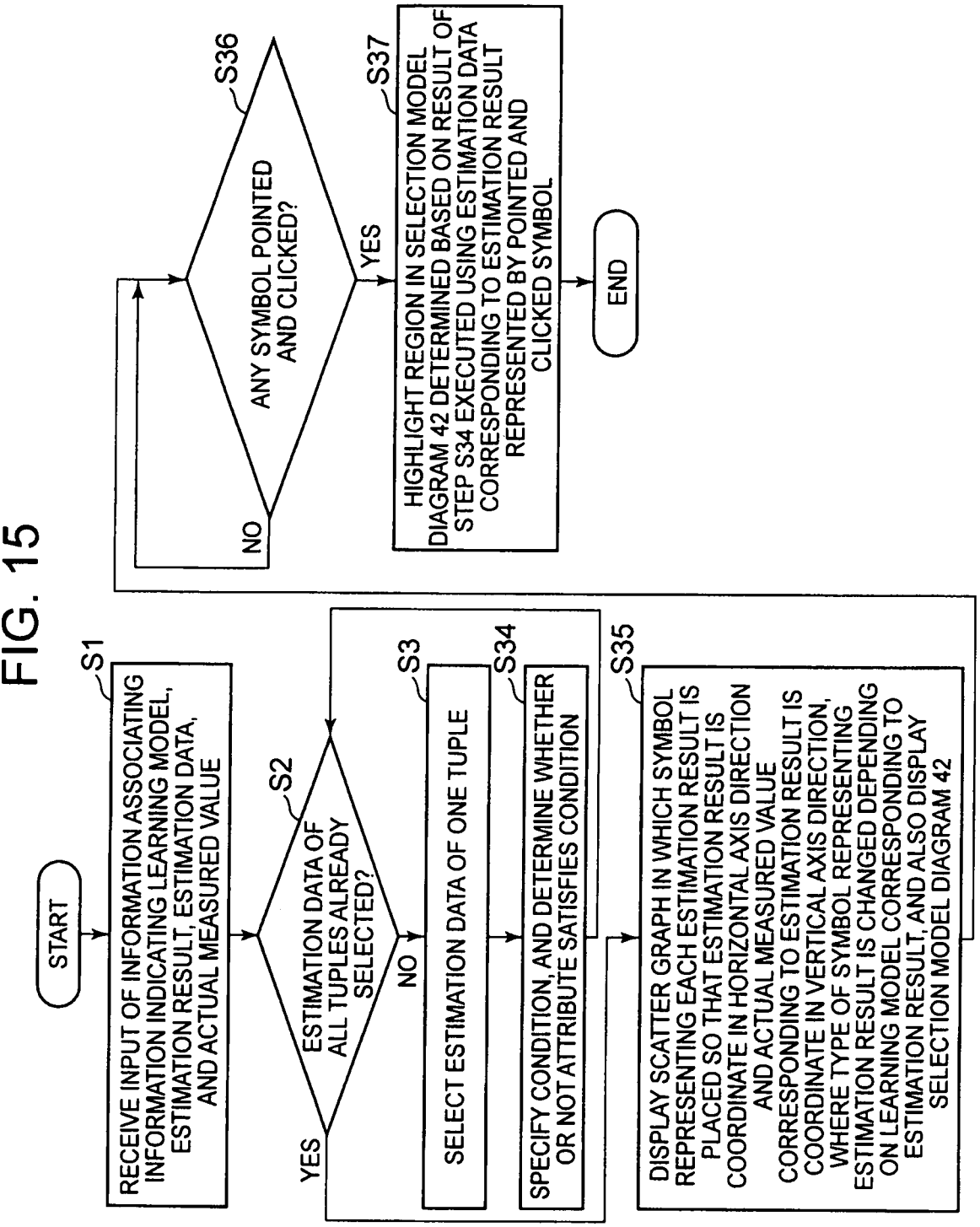
FIG. 15 is a flowchart depicting an example of a process in Exemplary Embodiment 4.

A process is described below. FIG. 15 is a flowchart depicting an example of the process in Exemplary Embodiment 4.

First, the input means 2 receives input of a plurality of tuples of information associating information indicating a learning model, an estimation result derived using the learning model, estimation data used when selecting the learning model, and an actual measured value (step S1). The input means 2 sends, for each tuple, the information indicating the learning model, the estimation result, and the actual measured value to the display means 4, and the estimation data to the condition specifying means 3.

In step S1, the input means 2 also receives input of a selection model and display data of the selection model. The estimation results display system 1 stores the selection model and the display data of the selection model in a storage device (not depicted in FIG. 8). Step S1 in this exemplary embodiment is the same as step S1 in Exemplary Embodiment 1, except that data (the display data of the selection model in the form depicted in FIG. 13) in which conditions for attributes in estimation data are assigned to a plurality of axes and learning models corresponding to the conditions are indicated in the space defined by the axes is input as the display data of the selection model.

Here, the display data of the selection model is data for displaying the selection model diagram 42, and the selection model may be the same as that in Exemplary Embodiment 1. For example, the selection model may be a tree structure model. Data for displaying such a tree structure selection model as the selection model diagram 42 is input as the display data of the selection model.

Next, the condition specifying means 3 determines whether or not the estimation data of all tuples has already been selected (step S2). In the case where there is any tuple whose estimation data has not been selected (step S2: No), the condition specifying means 3 selects the estimation data in the tuple (step S3).

The condition specifying means 3 specifies, using the estimation data selected in step S3 and the selection model, a condition subjected to determination of whether or not satisfied by the attribute in the estimation data when the estimator 12 selects the learning model corresponding to the estimation data (step S34). In step S34, the condition specifying means 3 also determines whether or not the attribute satisfies the condition. The condition specifying means 3 may execute step S34 by, starting at the root node of the selection model, repeatedly selecting one of two child nodes depending on whether or not the attribute in the estimation data satisfies the condition indicated by the node until a leaf node is reached.

For example, suppose estimation data including the attributes "air temperature 18° C." and "precipitation 15 mm/h" is selected in step S3. Also suppose the selection model depicted in FIG. 2 is input. In this case, the condition specifying means 3 specifies the conditions A and B, and obtains the determination result that "air temperature 18° C." does not satisfy the condition A and "precipitation 15 mm/h" satisfies the condition B.

The condition specifying means 3 sends the specified condition(s) and the determination result of whether or not the attribute satisfies the condition, to the display means 4.

After step S34, the process returns to step S2.

In the case where the estimation data of all tuples has already been selected (step S2: Yes), the display means 4 displays a scatter graph in which the symbol representing each estimation result is placed so that the estimation result is a coordinate in the horizontal axis direction and the actual measured value corresponding to the estimation result is a coordinate in the vertical axis direction. Here, the display means 4 changes the type of the symbol representing the estimation result depending on the learning model corresponding to the estimation result. The display means 4 also displays the selection model diagram 42 based on the display data of the selection model (step S35). The display means 4 also displays the cursor 31. In step S35, the image depicted in FIG. 14(a) is displayed.

The display means 4 then determines whether or not any symbol in the scatter graph is pointed and clicked (step S36). If no symbol is pointed and clicked (step S36: No), the display means 4 repeats the determination in step S36.

In the case where any symbol is pointed and clicked (step S36: Yes), the display means 4 highlights the region in the selection model diagram 42 determined based on the result of step S34 executed using the estimation data corresponding to the estimation result represented by the symbol (step S37). In detail, for each condition specified in step S34, the display means 4 specifies the range corresponding to the determination result (whether or not the attribute in the estimation data satisfies condition) in step S34 in the axis to which the condition is assigned. The display means 4 specifies, the region including the part where these ranges overlap from among the regions separated in the selection model diagram 42, and highlights the region.

Suppose the conditions A and B are specified and the determination result that "air temperature 18° C." does not satisfy the condition A and "precipitation 15 mm/h" satisfies the condition B is obtained in step S34 as in the aforementioned example. The following uses the selection model diagram depicted in FIG. 13 as an example. In this case, the display means 4 specifies, for the condition A, the range of not satisfying the condition A (the range of less than 20° C.) in the horizontal axis, and specifies, for the condition B, the range of satisfying the condition B (the range of 10 mm/h or more) in the vertical axis. The region including the part where these ranges overlap is the region corresponding to the learning model 2 in the selection model diagram in FIG. 13. Accordingly, in this example, the scatter graph and the selection model diagram 42 are displayed in step S37, as depicted in FIG. 14(b). Although an example of highlighting the region corresponding to the learning model 2 by adding a background pattern (a color may be used) to the region is depicted in FIG. 14(b), any other method of highlighting may be used in step S37.

After step S37, in the case where the cursor 31 moves away from the symbol, the display means 4 may stop highlighting the region in the selection model diagram 42, and repeat the operation from step S36 onward.

In step S36, the display means 4 may determine whether or not any symbol is in an on cursor state, and advances to step S37 when any symbol is in an on cursor state.

The region highlighted in step S37 corresponds to the range of satisfying the condition or the range of not satisfying the condition in each axis. In the example depicted in FIG. 13, the region corresponding to the learning model 1 lies across the range of satisfying the condition B (the range of 10 mm/h or more) and the range of not satisfying the condition B (the range of less than 10 mm/h) in the vertical axis. This means that whether or not the attribute in the estimation data satisfies the condition B is not determined when selecting the learning model 1. The observer can recognize which condition is subjected to determination of whether or not satisfied by the attribute in the estimation data when selecting the learning model used for deriving the estimation result, and recognize whether or not the attribute satisfies the condition. In other words, the observer can recognize the condition which is a factor leading to the selection of the learning model.

Moreover, in this exemplary embodiment, too, the observer can recognize which learning model is selected when deriving the estimation result. Further, in the case where a learning model with low estimation accuracy is selected, the observer can recognize the selected learning model with low estimation accuracy.

Figure 31:
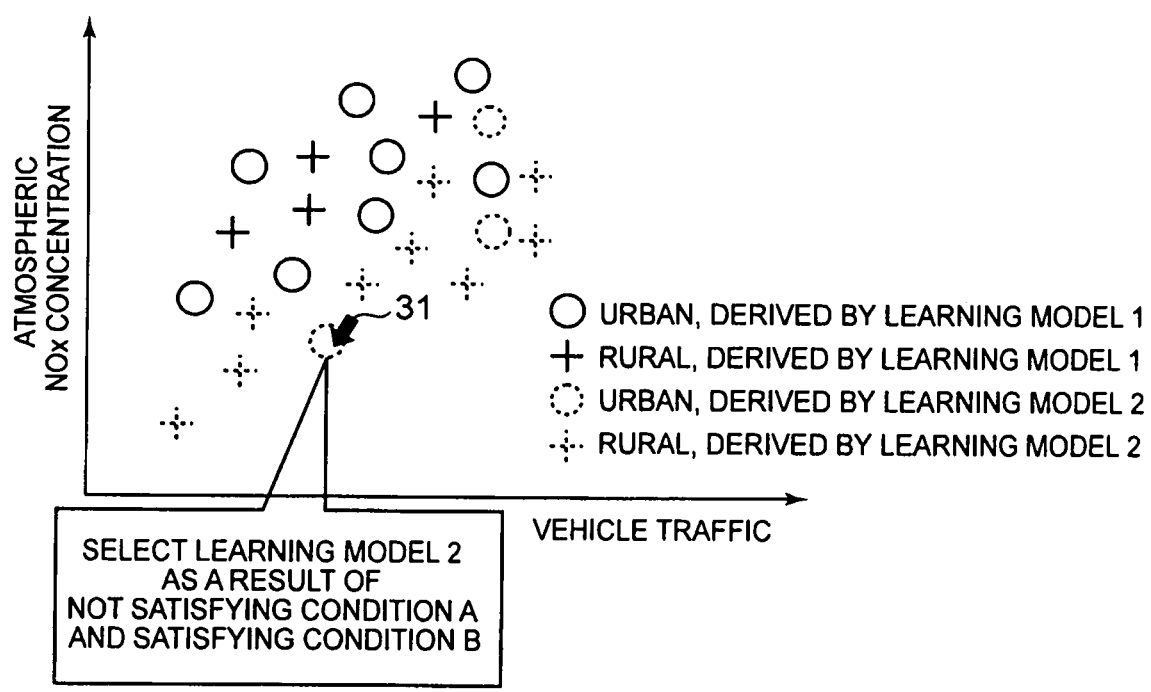
FIG. 31 is a diagram depicting a specific example of a display mode in the case of changing a symbol depending on a determination result and a learning model.

In each of Exemplary Embodiments 1 to 4, the axes of the scatter graph are not limited to the example depicted in FIG. 6, etc. For example, the two axes may each correspond to an attribute in the estimation data. A specific example is given below. For example, suppose the estimator 12 (see FIG. 1) selects a learning model using at least a vehicle traffic measured value and an atmospheric NOx concentration measured value from among the attributes included in the estimation data, and estimates (determines) whether the traffic and NOx concentration measurement point is "urban" or "rural". In this case, the display means 4 may display a scatter graph having an axis corresponding to vehicle traffic and an axis corresponding to atmospheric NOx concentration. The mode of setting the symbol in the scatter graph by the display means 4 may be, for example, a mode in which the display means 4 sets the symbol depending on the determination result (urban or rural) and also sets the symbol depending on the learning model used for the determination. For example, the display means 4 may change the shape of the symbol depending on the determination result (urban or rural), and changes the color or line type of the symbol depending on the learning model used for the determination. FIG. 31 is a diagram depicting a specific example of such a display mode.

Exemplary Embodiment 5

An estimation results display system in Exemplary Embodiment 5 of the present invention can be depicted by the block diagram in FIG. 8, as with the estimation results display system in Exemplary Embodiment 2. Hence, Exemplary Embodiment 5 is described below with reference to FIG. 8.

The estimation results display system 1 in Exemplary Embodiment 5 includes the input means 2, the condition specifying means 3, the display means 4, and the cursor manipulation means 7 (see FIG. 8).

The input means 2 receives input of a plurality of tuples of information (estimation result data) associating information indicating a learning model selected by the estimator 12 depending on a determination result of whether or not one or more types of attributes in estimation data satisfy one or more types of conditions, an estimation result derived using the learning model, and the estimation data. An example where the estimation result is calculated as a value is described here. Hence, the estimation result may also be referred to as "estimated value". In the case of not displaying the changes of the actual measured value, actual measured value information need not be included in each tuple. This exemplary embodiment describes an example where actual measured value information is not input, for simplicity's sake.

The input means 2 also receives input of a selection model used when the estimator 12 selects the learning model. The estimation results display system 1 may store the selection model in a storage device (not depicted in FIG. 8). In this exemplary embodiment, the input means 2 need not receive display data of the selection model because the tree structure graph 41 (see FIG. 6) or the selection model diagram 42 (see FIG. 14) does not need to be displayed.

The condition specifying means 3 is the same as the condition specifying means 3 in Exemplary Embodiment 2.

In Exemplary Embodiment 5, the display means 4 displays a first graph 71 in which a symbol representing each estimation result is arranged in predetermined order and a second graph 72 in which a symbol representing the learning model corresponding to the estimation result is arranged in predetermined order. The first graph 71 is a graph indicating the changes of the estimation result, and the second graph 72 is a graph indicating the changes of the selected learning model.

Figure 16:
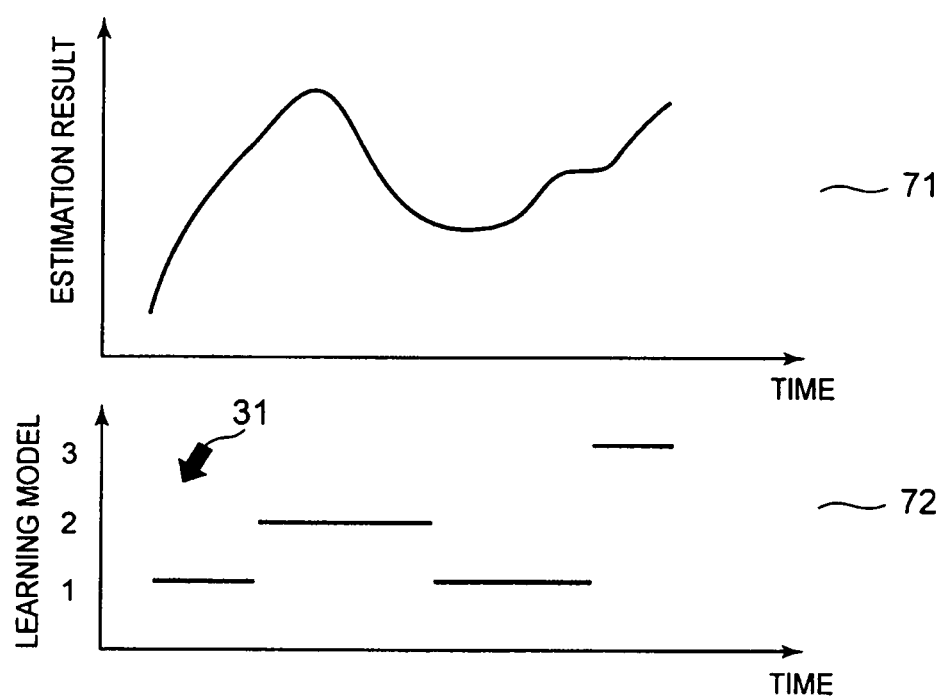
FIG. 16 is a schematic diagram depicting an example of an initial state of a graph displayed by display means in Exemplary Embodiment 5.

FIG. 16 is a schematic diagram depicting an example of the initial state of the graph displayed by the display means 4 in Exemplary Embodiment 5. The horizontal axis of the first graph 71 and the horizontal axis of the second graph 72 are each an axis representing the order of the tuples each associating information indicating a learning model, an estimation result, etc. In FIG. 16, the order is indicated by time, where the horizontal axis of the first graph 71 and the horizontal axis of the second graph 72 each represent time. In this case, information indicating a learning model, an estimation result, etc. input to the input means 2 may be accompanied with the corresponding time information. Alternatively, each tuple (estimation result data) associating information indicating a learning model, an estimation result, and estimation data may be input to the input means 2 in order of the time corresponding to the estimation result.

Each of the horizontal axis of the first graph 71 and the horizontal axis of the second graph 72 may not necessarily be an axis representing time, and may be, for example, an axis representing estimation result data input order.

The vertical axis of the first graph 71 is an axis corresponding to the estimation result. The vertical axis of the second graph 72 is an axis corresponding to the type of the learning model, and has identification information of each learning model as a coordinate.

The display means 4 displays the first graph 71 in which the symbol representing each estimation result is arranged in predetermined order (in order of the time corresponding to the estimation result in this example). In more detail, the display means 4 arranges the symbol representing each estimation result in predetermined order (in order of the time corresponding to the estimation result in this example) along the horizontal axis, and sets the estimation result calculated as a value to be a coordinate in the vertical axis direction in the first graph 71. In other words, the display means 4 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). The type of the symbol representing each estimation result may be common.

The display means 4 also displays the second graph 72 in which the symbol representing each learning model is arranged in the same predetermined order as above. In more detail, the display means 4 arranges the symbol representing each learning in the same predetermined order as above along the horizontal axis, and sets the information (i.e. identification information) indicating the learning model to be a coordinate in the vertical axis direction in the second graph 72. In other words, the display means 4 places the symbol representing each learning model at the position at which the ordinal position of the information indicating the learning model is an x coordinate and the information indicating the learning model is a y coordinate. The type of the symbol representing each learning model may be common.

An estimation result and information indicating a learning model corresponding to the estimation result are assigned a common ordinal position (time in this example). Hence, the display means 4 places a symbol representing an estimation result and a symbol representing a learning model corresponding to the estimation result at the common x coordinate position. The display means 4 preferably displays the first graph 71 and the second graph 72 in a vertically aligned state so that the observer can easily recognize the correspondence relation of the symbols having the common x coordinate.

In each of the first graph 71 and the second graph 72, a sequence of symbols is recognized as a line if the interval between symbols is short. FIG. 16 depicts an example where, in each of the first graph 71 and the second graph 72, the interval between symbols is short and a sequence of symbols is recognized as a line.

Figure 17:
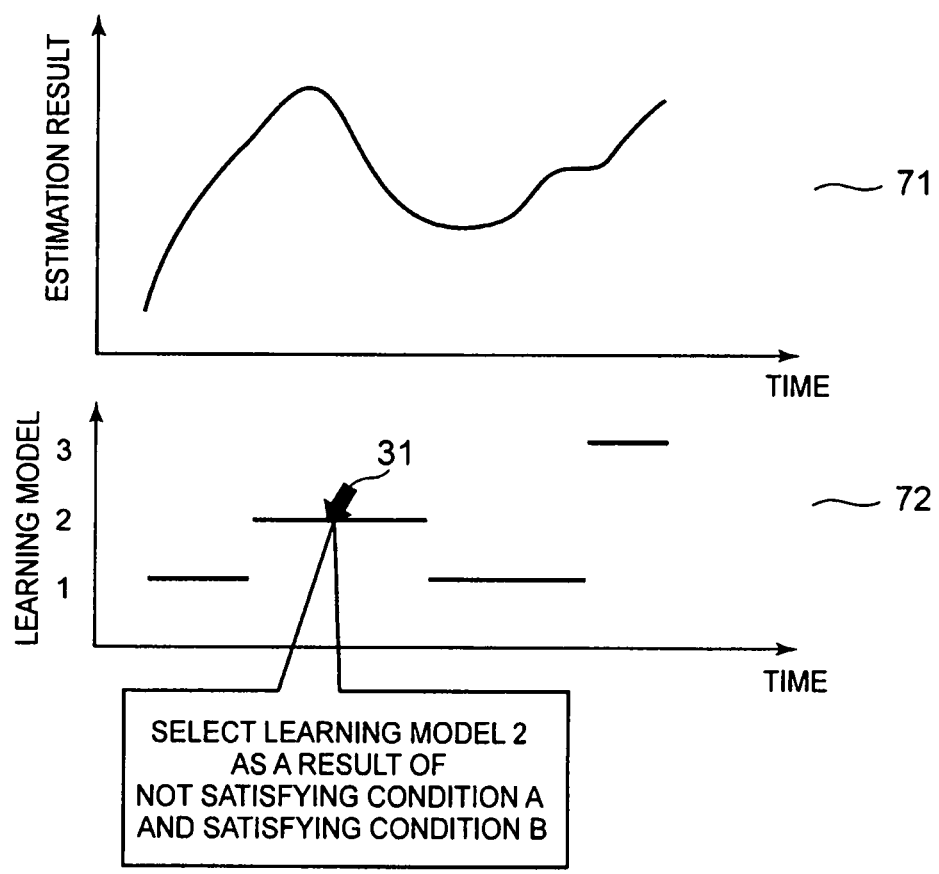
FIG. 17 is a schematic diagram depicting an example of a display state when a symbol in a second graph is pointed and clicked.

In the case where any symbol in the second graph 72 is pointed and clicked, the display means 4 displays the condition subjected to determination of whether or not satisfied by the attribute in the estimation data when selecting the learning model corresponding to the estimation result represented by the symbol. This exemplary embodiment describes an example where the display means 4 also displays the determination result of whether or not the attribute in the estimation data satisfies the condition. FIG. 17 depicts an example of the display state when a symbol in the second graph 72 is pointed and clicked.

Figure 18:
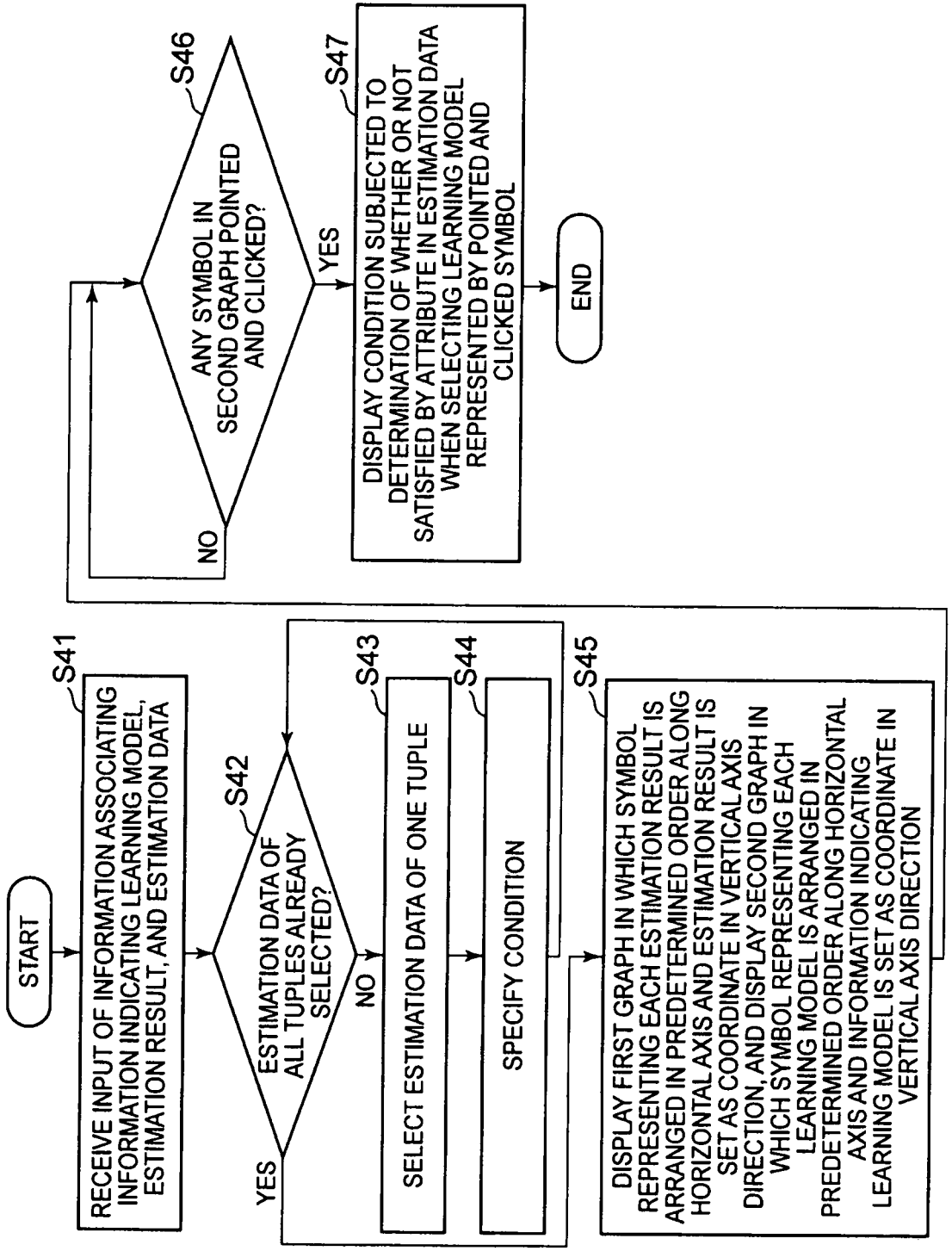
FIG. 18 is a flowchart depicting an example of a process in Exemplary Embodiment 5.

A process is described below. FIG. 18 is a flowchart depicting an example of the process in Exemplary Embodiment 5.

The input means 2 receives input of a plurality of tuples of information associating information indicating a learning model, an estimation result derived using the learning model, and estimation data used when selecting the learning model (step S41). The input means 2 sends, for each tuple, the information indicating the learning model and the estimation result to the display means 4, and the estimation data to the condition specifying means 3.

In step S41, the input means 2 also receives input of a selection model. The estimation results display system 1 stores the selection model in a storage device (not depicted in FIG. 8).

Next, the condition specifying means 3 determines whether or not the estimation data of all tuples has already been selected (step S42). In the case where there is any tuple whose estimation data has not been selected (step S42: No), the condition specifying means 3 selects the estimation data in the tuple (step S43).

The condition specifying means 3 specifies, using the estimation data selected in step S43 and the selection model, a condition subjected to determination of whether or not satisfied by the attribute in the estimation data when the estimator 12 selects the learning model corresponding to the estimation data (step S44). In step S44, the condition specifying means 3 also determines whether or not the attribute satisfies the specified condition. The condition specifying means 3 sends the specified condition and the determination result of whether or not the attribute satisfies the specified condition, to the display means 4.

Steps S41 to S44 are the same as steps S11 to S14 in Exemplary Embodiment 2.

After step S44, the process returns to step S42.

In the case where the estimation data of all tuples has already been selected (step S42: Yes), the display means 4 displays the first graph 71 in which the symbol representing each estimation result is arranged in predetermined order along the horizontal axis and the estimation result is set as a coordinate in the vertical axis direction. Together with the first graph 71, the display means 4 also displays the second graph 72 in which the symbol representing each learning model is arranged in the predetermined order along the horizontal axis and the information indicating the learning model is set as a coordinate in the vertical axis direction (step S45). The display means 4 also displays the cursor 31. In step S45, the screen depicted in FIG. 16 is displayed.

The display means 4 then determines whether or not any symbol in the second graph 72 is pointed and clicked (step S46). If no symbol in the second graph 72 is pointed and clicked (step S46: No), the display means 4 repeats the determination in step S46.

In the case where any symbol in the second graph 72 is pointed and clicked (step S46: Yes), the display means 4 displays the condition subjected to determination of whether or not satisfied by the attribute in the estimation data when selecting the learning model represented by the symbol, and the determination result of whether or not the attribute satisfies the condition (step S47). In step S47, the screen depicted in FIG. 17 is displayed. In the example depicted in FIG. 17, the information "select learning model 2 as a result of not satisfying condition A and satisfying condition B" is displayed.

After step S47, in the case where the cursor 31 moves away from the symbol, the display means 4 may repeat the operation from step S46 onward.

In step S46, the display means 4 may determine whether or not any symbol is in an on cursor state, and advance to step S47 when any symbol is in an on cursor state.

According to this exemplary embodiment, in the case where any symbol in the second graph 72 is pointed and clicked, the display means 4 displays the condition subjected to determination of whether or not satisfied by the attribute in the estimation data when selecting the learning model represented by the symbol, and the determination result of whether or not the attribute satisfies the condition. This enables the observer to recognize which condition is subjected to determination of whether or not satisfied by the attribute in the estimation data when selecting the learning model used for deriving the estimation result, and also recognize whether or not the attribute satisfies the condition. Thus, the observer can recognize the condition which is a factor leading to the selection of the learning model.

Moreover, in this exemplary embodiment, the display means 4 displays the first graph 71 and the second graph 72 so that the corresponding symbols have a common x coordinate. This enables the observer to recognize which learning model is selected when driving an estimation result.

Exemplary Embodiment 6

In Exemplary Embodiment 5, the first graph 71 and the second graph 72 are displayed to enable the observer to recognize which learning model is selected when driving an estimation result. In Exemplary Embodiment 6, one graph is displayed to enable the observer to recognize which learning model is selected when driving an estimation result.

An estimation results display system in Exemplary Embodiment 6 of the present invention can be depicted by the block diagram in FIG. 8, as with the estimation results display system in Exemplary Embodiment 2. Hence, Exemplary Embodiment 6 is described below with reference to FIG. 8.

The estimation results display system 1 in Exemplary Embodiment 6 includes the input means 2, the condition specifying means 3, the display means 4, and the cursor manipulation means 7 (see FIG. 8).

The input means 2 and the condition specifying means 3 are the same as the input means 2 and the condition specifying means 3 in Exemplary Embodiment 5.

Figure 19:
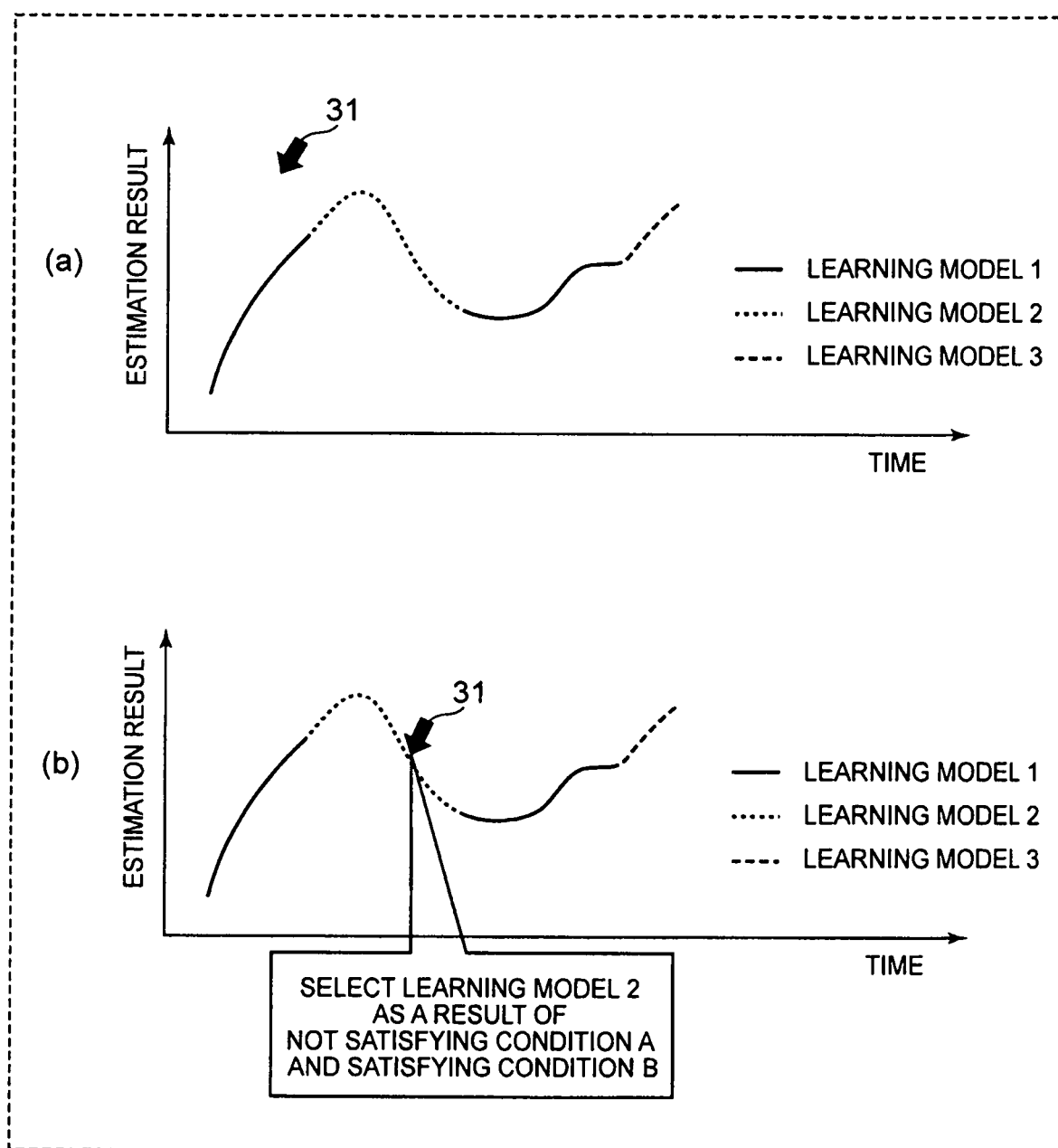
FIG. 19 is a schematic diagram depicting an example of a graph displayed by display means in Exemplary Embodiment 6.

The display means 4 displays a graph representing each estimation result by a symbol, where the type of the symbol is changed depending on the learning model corresponding to the estimation result. FIG. 19 is a schematic diagram depicting an example of the graph displayed by the display means 4 in Exemplary Embodiment 6. FIG. 19(a) depicts the displayed graph in its initial state. FIG. 19(b) depicts the graph in the case where a symbol representing an estimation result is pointed and clicked.

The horizontal axis of the graph displayed in this exemplary embodiment is an axis representing the order of the estimation results. FIG. 19 depicts an example where the horizontal axis of the graph represents time. In this case, each estimation result input to the input means 2 may be accompanied with the corresponding time information. Alternatively, each tuple (estimation result data) associating information indicating a learning model, an estimation result, and estimation data may be input to the input means 2 in order of the time corresponding to the estimation result.

The horizontal axis of the graph may not necessarily be an axis representing time, and may be, for example, an axis representing estimation result data input order.

The display means 4 displays the graph in which the symbol representing each estimation result is arranged in predetermined order (in order of the time corresponding to the estimation result in this example). In more detail, the display means 4 arranges the symbol representing each estimation result in predetermined order (in order of the time corresponding to the estimation result in this example) along the horizontal axis, and sets the estimation result calculated as a value to be a coordinate in the vertical axis direction in the graph. In other words, the display means 4 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). A sequence of symbols is recognized as a line if the interval between symbols is short. FIG. 19 depicts an example where the interval between symbols is short and a sequence of symbols is recognized as a line. In this case, the operation of the display means 4 can be described as displaying a line graph representing the changes of the estimation result.

Moreover, the display means 4 changes the type of the symbol representing the estimation result, depending on the learning model corresponding to the estimation result. In detail, the display means 4 arranges different symbols in the graph, as a symbol representing an estimation result derived using the learning model 1, a symbol representing an estimation result derived using the learning model 2, a symbol representing an estimation result derived using the learning model 3, etc. The same applies to the case where more types of learning models are selected in estimation result derivation. In the case where the display means 4 displays the line graph representing the changes of the estimation result, the display means 4 displays such a graph in which the attribute of the line is changed depending on the learning model corresponding to the estimation result.

In the case of changing the type of the symbol depending on the type of the learning model, the display means 4 may change, for example, the color of the symbol or the shape of the symbol. How the type of the symbol is changed is not particularly limited. In the case where the display means 4 displays the line graph representing the changes of the estimation result, the attribute of the line is, for example, the appearance of the line such as line color, line thickness, or line type (e.g. solid line, dotted line, dashed-dotted line, etc.). The attribute of the line is not limited to the appearance of the line. For example, the display means 4 may display information indicating the learning model corresponding to the line when the line is pointed and clicked or the like, as described in Exemplary Embodiment 5.

In the case where any symbol in the graph is pointed and clicked, the display means 4 displays the condition subjected to determination of whether or not satisfied by the attribute in the estimation data when selecting the learning model corresponding to the estimation result represented by the symbol. FIG. 19(b) depicts this display state. This exemplary embodiment describes an example where the display means 4 also displays the determination result of whether or not the attribute satisfies the condition.

Figure 20:
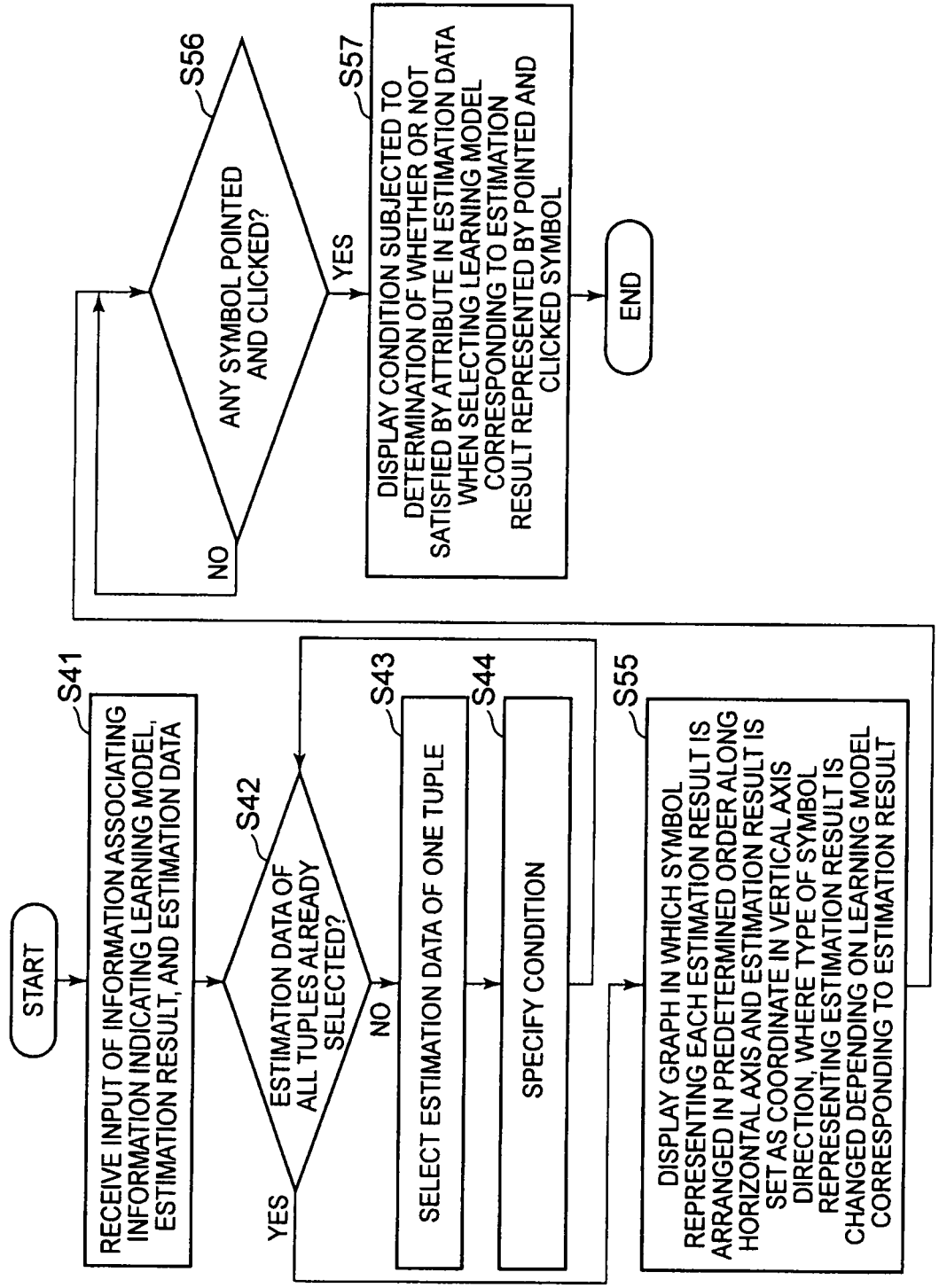
FIG. 20 is a flowchart depicting an example of a process in Exemplary Embodiment 6.

A process is described below. FIG. 20 is a flowchart depicting an example of the process in Exemplary Embodiment 6. Steps S41 to S44 are the same as steps S41 to S44 in Exemplary Embodiment 5, and their description is omitted.

In the case of determining in step S42 that the estimation data of all tuples has already been selected (step S42: Yes), the display means 4 displays the graph in which the symbol representing each estimation result is arranged in predetermined order along the horizontal axis and the estimation result is set as a coordinate in the vertical axis direction, where the type of the symbol representing the estimation result is changed depending on the learning model corresponding to the estimation result (step S55). The display means 4 also displays the cursor 31. In step S55, the screen depicted in FIG. 19(a) is displayed.

The display means 4 then determines whether or not any symbol in the graph is pointed and clicked (step S56). If no symbol is pointed and clicked (step S56: No), the display means 4 repeats the determination in step S56.

In the case where any symbol is pointed and clicked (step S56: Yes), the display means 4 displays the condition subjected to determination of whether or not satisfied by the attribute in the estimation data when selecting the learning model corresponding to the estimation result represented by the symbol, and the determination result of whether or not the attribute satisfies the condition (step S57). In step S57, the screen depicted in FIG. 19(b) is displayed. In the example depicted in FIG. 19(b), the information "select learning model 2 as a result of not satisfying condition A and satisfying condition B" is displayed.

After step S57, in the case where the cursor 31 moves away from the symbol, the display means 4 may repeat the operation from step S56 onward.

In step S56, the display means 4 may determine whether or not any symbol is in an on cursor state, and advance to step S57 when any symbol is in an on cursor state.

In this exemplary embodiment, the observer can recognize which condition is subjected to determination of whether or not satisfied by the attribute in the estimation data when selecting the learning model used for deriving the estimation result, and also recognize whether or not the attribute satisfies the condition, as in Exemplary Embodiment 5. Thus, the observer can recognize the condition which is a factor leading to the selection of the learning model.

Moreover, in this exemplary embodiment, the display means 4 changes the type of the symbol representing the estimation result depending on the learning model corresponding to the estimation result. This enables the observer to recognize which learning model is selected when driving the estimation result.

Figure 21:
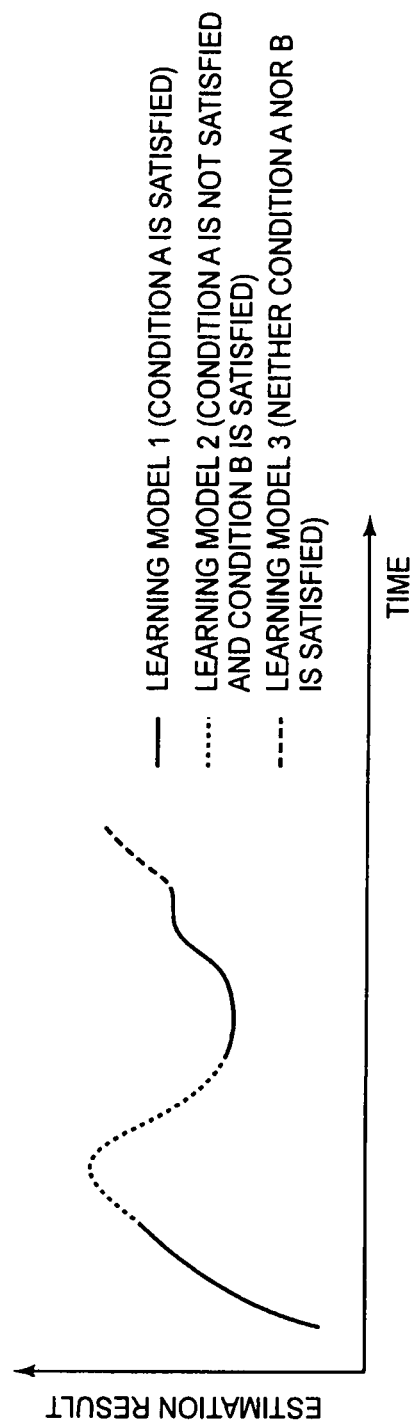
FIG. 21 is a schematic diagram depicting an example of a graph displayed in a modification of Exemplary Embodiment 6.

The following describes a modification of Exemplary Embodiment 6. In Exemplary Embodiment 6, the display means 4 displays the information as depicted in FIG. 19(b) in the case where, for example, a symbol is pointed and clicked. This information may be displayed in a legend indicating the type of the symbol. For example, the display means 4 may display a graph depicted in FIG. 21 in step S55 in Exemplary Embodiment 6. In this case, the display means 4 does not need to execute the process from step S56 onward in FIG. 20. Moreover, the cursor manipulation means 7 may be omitted in the modification of Exemplary Embodiment 6.

Exemplary Embodiment 7

In Exemplary Embodiment 7, too, one graph is displayed to enable the observer to recognize which learning model is selected when driving an estimation result.

An estimation results display system in Exemplary Embodiment 7 of the present invention can be depicted by the block diagram in FIG. 8, as with the estimation results display system in Exemplary Embodiment 2. Hence, Exemplary Embodiment 7 is described below with reference to FIG. 8.

The estimation results display system 1 in Exemplary Embodiment 6 includes the input means 2, the condition specifying means 3, the display means 4, and the cursor manipulation means 7 (see FIG. 8).

The input means 2 and the condition specifying means 3 are the same as the input means 2 and the condition specifying means 3 in Exemplary Embodiment 5 or 6.

Figure 22:
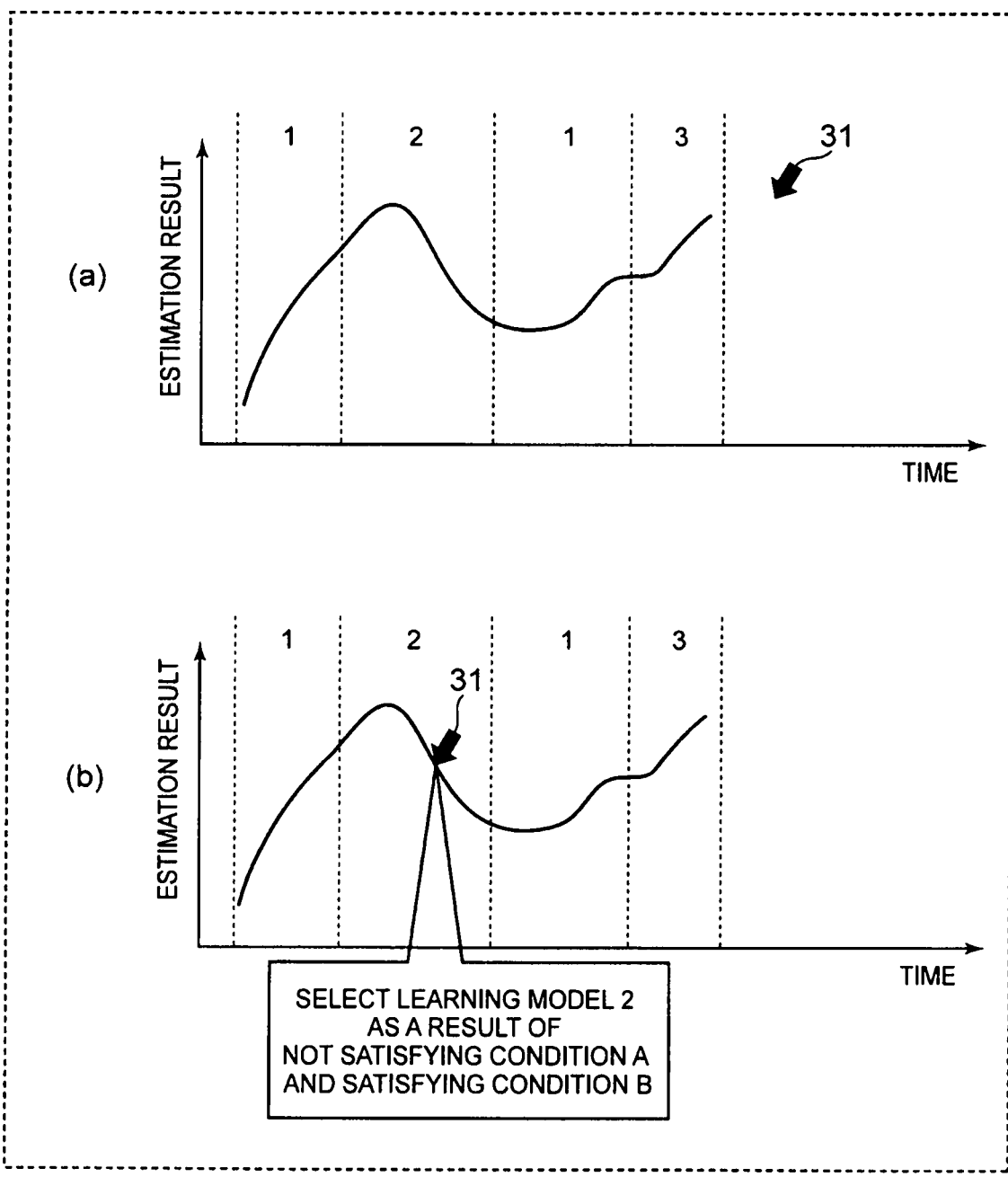
FIG. 22 is a schematic diagram depicting an example of a graph displayed by display means in Exemplary Embodiment 7.

The display means 4 displays a graph representing each estimation result by a symbol. FIG. 22 is a schematic diagram depicting an example of the graph displayed by the display means 4 in Exemplary Embodiment 7. FIG. 22(a) depicts the displayed graph in its initial state. FIG. 22(b) depicts the graph in the case where a symbol representing an estimation result is pointed and clicked.

The horizontal axis of the graph displayed in this exemplary embodiment is an axis representing the order of the estimation results. FIG. 22 depicts an example where the horizontal axis of the graph represents time. In this case, each estimation result input to the input means 2 may be accompanied with the corresponding time information. Alternatively, each tuple (estimation result data) associating information indicating a learning model, an estimation result, and estimation data may be input to the input means 2 in order of the time corresponding to the estimation result.

The horizontal axis of the graph may not necessarily be an axis representing time, and may be, for example, an axis representing estimation result data input order.

The display means 4 displays the graph in which the symbol representing each estimation result is arranged in predetermined order (in order of the time corresponding to the estimation result in this example). In more detail, the display means 4 arranges the symbol representing each estimation result in predetermined order (in order of the time corresponding to the estimation result in this example) along the horizontal axis, and sets the estimation result calculated as a value to be a coordinate in the vertical axis direction in the graph. In other words, the display means 4 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). A sequence of symbols is recognized as a line if the interval between symbols is short. FIG. 22 depicts an example where the interval between symbols is short and a sequence of symbols is recognized as a line.

The operation of the display means 4 described here is the same as the operation of the display means 4 in Exemplary Embodiment 6. In Exemplary Embodiment 7, however, the display means 4 uses a common type for all symbols unlike in Exemplary Embodiment 6.

In Exemplary Embodiment 7, the display means 4 divides the region in the graph depending on the learning model corresponding to the estimation result represented by each symbol. This operation is described below.

The symbols are arranged in the horizontal axis direction. In the case where the learning models corresponding to the estimation results represented by two symbols adjacent in the horizontal axis direction are different, the display means 4 displays a boundary line perpendicular to the horizontal axis between the two symbols. For example, suppose a learning model corresponding to an estimation result represented by a symbol (denoted by P) is "learning model 1", and a learning model corresponding to an estimation result represented by a symbol (denoted by Q) following the symbol P is "learning model 2". In this case, the display means 4 displays a boundary line perpendicular to the horizontal axis between the symbols P and Q. In FIG. 22, each boundary line is indicated by a dashed line.

The display means 4 may also display a boundary line near a symbol which is an endpoint (see FIG. 22).

The symbols in each region defined by adjacent two boundary lines represent estimation results derived using a common learning model. Thus, each region defined by adjacent two boundary lines corresponds to one learning model. The display means 4 displays each region defined by adjacent two boundary lines, in a mode associated with the learning model corresponding to the region. In the example depicted in FIG. 22, the display means 4 displays, in each region defined by adjacent two boundary lines, an identification number for identifying the learning model corresponding to the region. The graph in FIG. 22 includes four regions each of which is defined by adjacent two boundary lines, and these regions correspond to "learning model 1", "learning model 2", "learning model 1", and "learning model 3" from left to right.

Alternatively, the display means 4 may display each region defined by adjacent two boundary lines, in a background color associated with the learning model corresponding to the region. For example, the display means 4 may present the learning model corresponding to each region by setting the background color of the region corresponding to "learning model 1" to red and the background color of the region corresponding to "learning model 2" to blue.

How the display mode of each individual region is changed depending on the type of the learning model is not particularly limited.

In the case where any symbol in the graph is pointed and clicked, the display means 4 displays the condition subjected to determination of whether or not satisfied by the attribute in the estimation data when selecting the learning model corresponding to the estimation result represented by the symbol. FIG. 22(*b*) depicts this display state. This exemplary embodiment describes an example where the display means 4 also displays the determination result of whether or not the attribute satisfies the condition.

Figure 23:
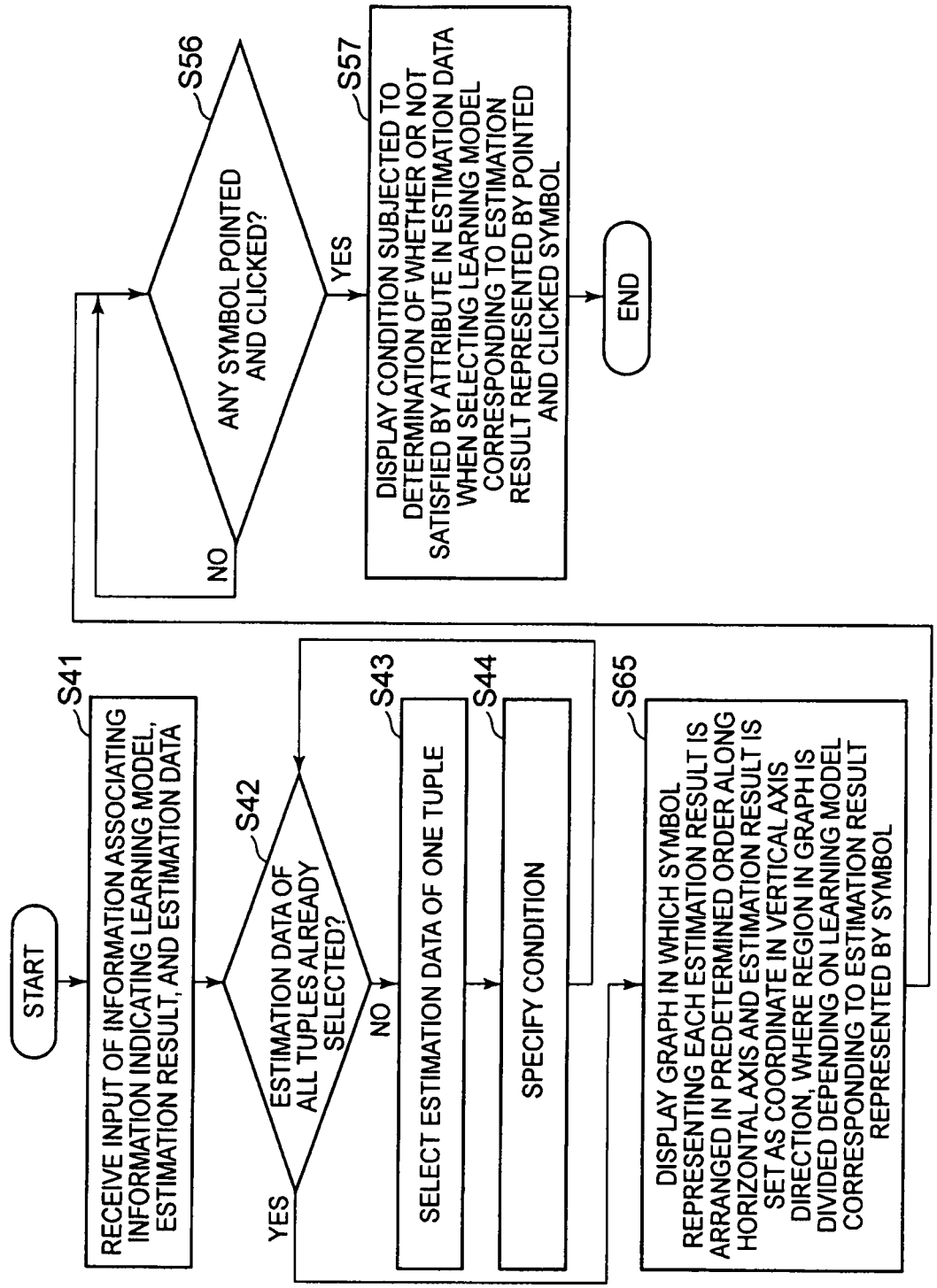
FIG. 23 is a flowchart depicting an example of a process in Exemplary Embodiment 7.

A process is described below. FIG. 23 is a flowchart depicting an example of the process in Exemplary Embodiment 7. Steps S41 to S44 are the same as steps S41 to S44 in Exemplary Embodiment 5 or 6, and their description is omitted.

In the case of determining in step S42 that the estimation data of all tuples has already been selected (step S42: Yes), the display means 4 displays the graph in which the symbol representing each estimation result is arranged in predetermined order along the horizontal axis and the estimation result is set as a coordinate in the vertical axis direction, where the region in the graph is divided depending on the learning model corresponding to the estimation result represented by the symbol (step S65). The display means 4 also displays the cursor 31. In step S65, the screen depicted in FIG. 22(*a*) is displayed.

Steps S56 and S57 which follow are the same as steps S56 and S57 in Exemplary Embodiment 6. In step S57, however, the display means 4 displays the condition subjected to determination of whether or not satisfied by the attribute in the estimation data when selecting the learning model corresponding to the estimation result represented by the pointed and clicked symbol and the determination result of whether or not the attribute satisfies the condition, together with the graph displayed in step S65. In step S57 in Exemplary Embodiment 7, the screen depicted in FIG. 22(*b*) is displayed.

After step S57, in the case where the cursor 31 moves away from the symbol, the display means 4 may repeat the operation from step S56 onward.

In step S56, the display means 4 may determine whether or not any symbol is in an on cursor state, and advance to step S57 when any symbol is in an on cursor state.

In this exemplary embodiment, the observer can recognize which condition is subjected to determination of whether or not satisfied by the attribute in the estimation data when selecting the learning model used for deriving the estimation result, and also recognize whether or not the attribute satisfies the condition, as in Exemplary Embodiment 5 or 6. Thus, the observer can recognize the condition which is a factor leading to the selection of the learning model.

Moreover, the display means 4 divides the region in the graph depending on the learning model corresponding to the estimation result represented by the symbol. This enables the observer to recognize which learning model is selected when driving the estimation result represented by the symbol.

Exemplary Embodiment 8

Figure 24:
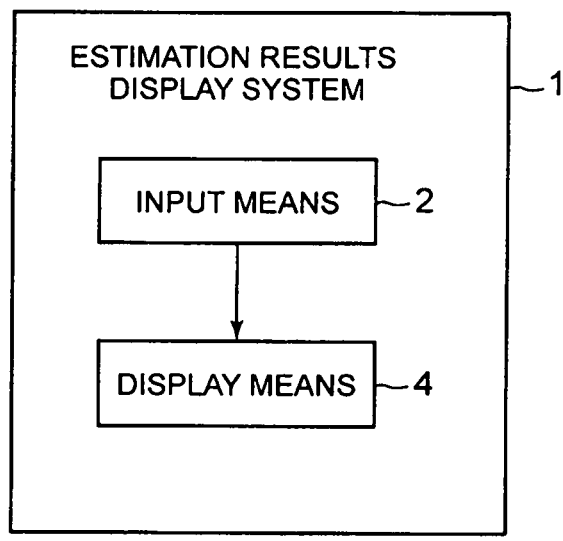
FIG. 24 is a block diagram depicting an example of the structure of an estimation results display system in Exemplary Embodiment 8 of the present invention.

FIG. 24 is a block diagram depicting an example of the structure of an estimation results display system in Exemplary Embodiment 8 of the present invention. An estimation results display system 1 in Exemplary Embodiment 8 includes input means 2 and display means 4.

The input means 2 receives input of a plurality of tuples of information (estimation result data) associating information indicating a learning model selected by the estimator 12 depending on a determination result of whether or not one or more types of attributes in estimation data satisfy one or more types of conditions, an estimation result derived using the learning model, and the estimation data. An example where the estimation result is calculated as a value is described here. Hence, the estimation result may also be referred to as "estimated value".

The input means 2 also receives input of a selection model used when the estimator 12 selects the learning model. The estimation results display system 1 may store the selection model received once in a storage device (not depicted in FIG. 24). This exemplary embodiment describes an example where the selection model depicted in FIG. 2 is input.

In Exemplary Embodiment 8, the display means 4 displays the same graphs as the first graph 71 and second graph 72 in Exemplary Embodiment 5, and also displays a graph representing the changes of the value of each attribute in the estimation data (hereafter referred to as "third graph").

Figure 25:
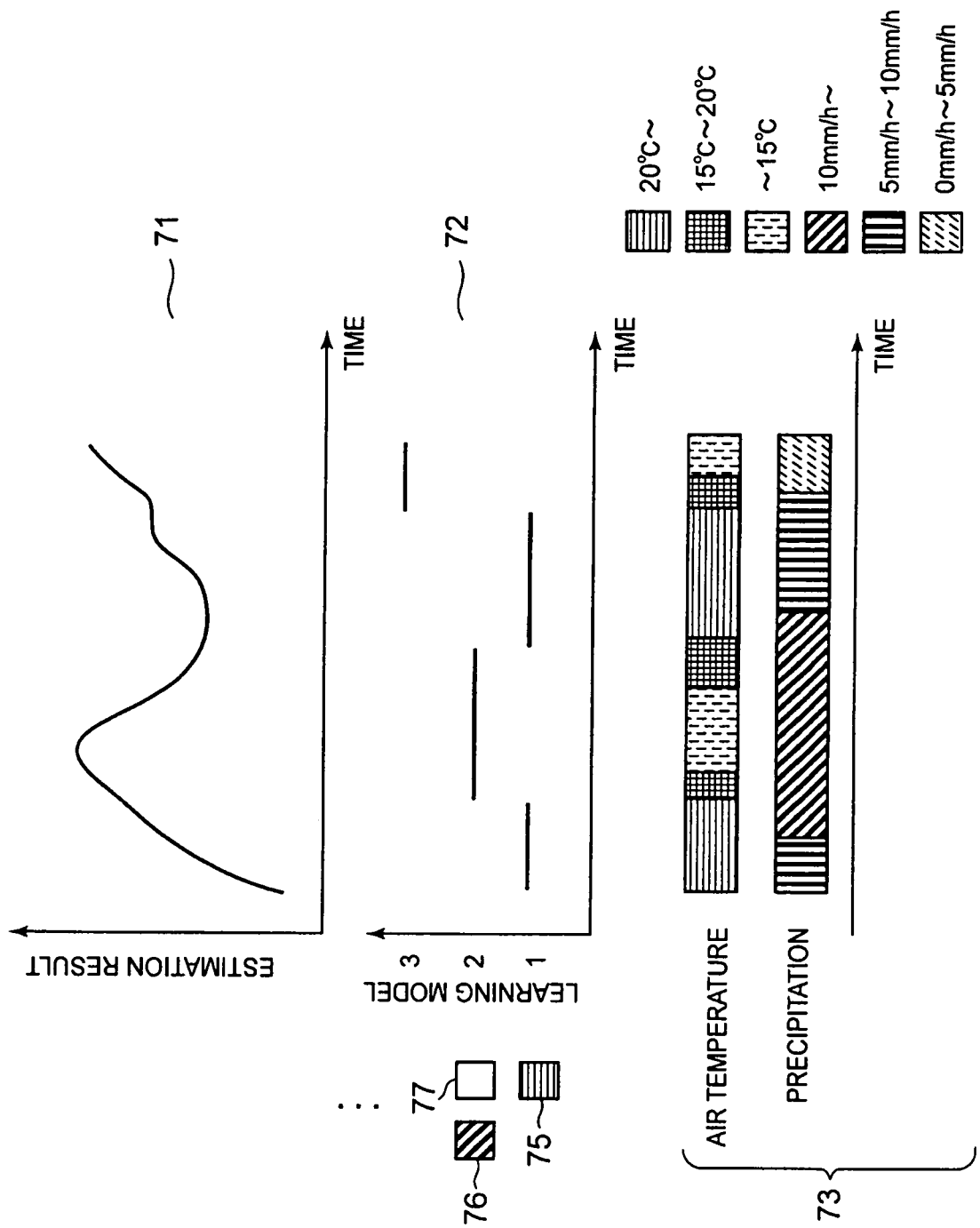
FIG. 25 is a schematic diagram depicting an example of a graph displayed by display means in Exemplary Embodiment 8.

FIG. 25 is a schematic diagram depicting an example of the graph displayed by the display means 4 in Exemplary Embodiment 8. The operation of the display means 4 displaying the first graph 71 and the second graph 72 is the same as the operation of the display means 4 displaying the first graph 71 and the second graph 72 in Exemplary Embodiment 5, and its description is omitted.

The third graph 73 is a graph representing the changes of the value of each attribute in the estimation data, as mentioned above. In the example depicted in FIG. 25, estimation data including air temperature and precipitation as attributes is input, and the display means 4 displays a graph representing the changes of the air temperature and the changes of the precipitation as the third graph 73. In the example depicted in FIG. 25, the third graph 73 is in heat map form of being represented in a color or pattern corresponding to a range to which an attribute value belongs.

The horizontal axis of the third graph 73 is common with the horizontal axis of the first graph 71 and the horizontal axis of the second graph 72. Thus, the display means 4 sets a symbol representing an estimation result, a symbol representing the learning model corresponding to the estimation result, and a color or pattern representing each attribute in the estimation data corresponding to the estimation result to have a common x coordinate. Although FIG. 25 depicts an example where the horizontal axis of each of the first to third graphs represents time, the horizontal axis of each graph need not necessarily be an axis representing time as described in Exemplary Embodiment 5.

The display means 4 may display a legend for each color or pattern used in the third graph 73, as depicted in FIG. 25. Here, the display means 4 references to a node indicating each condition in the selection model, and employs a value used in the condition as one of a plurality of boundary values when dividing the attribute value range.

As an example, a node indicating "condition that air temperature is 20° C. or more" is included in the selection model depicted in FIG. 2. Accordingly, in the case of representing the changes of the air temperature in heat map form in the third graph 73, the display means 4 uses 20° C. as one of a plurality of boundary values for the air temperature range. In the example depicted in FIG. 25, the air temperature range is divided into the range of less than 15° C., the range of 15° C. or more and less than 20° C., and the range of 20° C. or more, where "20° C." is used as one of the boundary values.

As another example, a node indicating "condition that precipitation is 10 mm/h or more" is included in the selection model depicted in FIG. 2. Accordingly, in the case of representing the changes of the precipitation in heat map form in the third graph 73, the display means 4 uses 10 mm/h as one of a plurality of boundary values for the precipitation range. In the example depicted in FIG. 25, the precipitation is divided into the range of 0 mm/h or more and less than 5 mm/h, the range of 5 mm/h or more and less than 10 mm/h, and the range of 10 mm/h or more, where "10 mm/h" is used as one of the boundary values.

The display means 4 may also display, in the second graph 72, the color or pattern corresponding to the attribute range for selecting each individual type of learning model, in association with the coordinate value in the vertical axis representing the type of the learning model. The display means 4 can specify the attribute range for selecting each individual type of learning model, by tracking the path from each leaf node to the root node in the selection model.

As an example, the display means 4 specifies "air temperature of 20° C. or more" as the attribute range for selecting the learning model 1, by tracking the path from the leaf node indicating the learning model 1 to the root node in the selection model depicted in FIG. 2. The display means 4 then displays an icon 75 in the color or pattern representing "air temperature of 20° C. or more", near the coordinate "1" in the vertical axis of the second graph 72.

As another example, the display means 4 specifies "precipitation of 10 mm/h or more" and "air temperature of less than 20° C." as the attribute range for selecting the learning model 2, by tracking the path from the leaf node indicating the learning model 2 to the root node in the selection model depicted in FIG. 2. The display means 4 then displays an icon 76 in the color or pattern representing "precipitation of 10 mm/h or more", near the coordinate "2" in the vertical axis of the second graph 72. Meanwhile, there are a plurality of colors or patterns corresponding to "air temperature of less than 20° C.". In the example depicted in FIG. 25, an icon 77 in white color with no pattern is displayed as an icon indicating that the attribute range corresponds to a plurality of types of colors or patterns.

Figure 26:
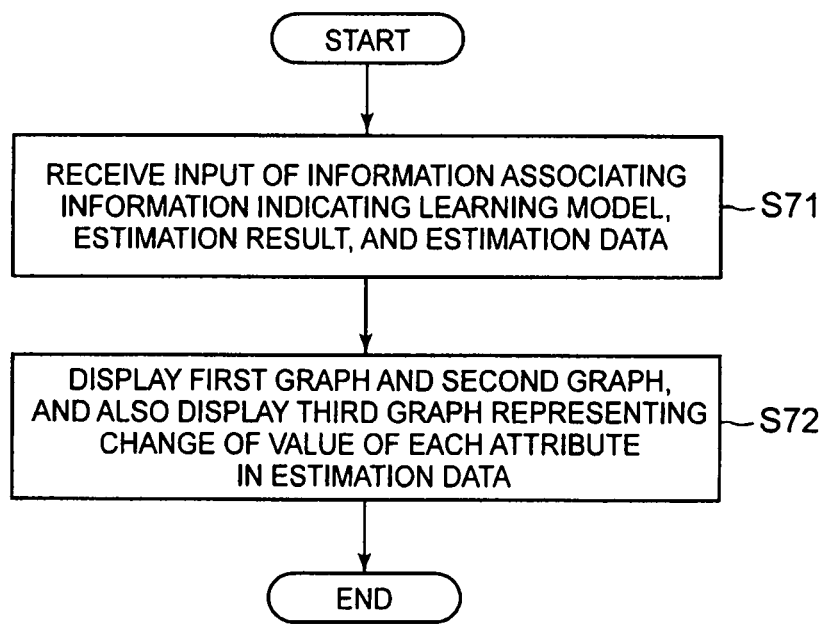
FIG. 26 is a flowchart depicting an example of a process in Exemplary Embodiment 8.

A process is described below. FIG. 26 is a flowchart depicting an example of the process in Exemplary Embodiment 8.

First, the input means 2 receives input of a plurality of tuples of information associating information indicating a learning model, an estimation result derived using the learning model, and estimation data used when selecting the learning model (step S71). The input means 2 sends each input tuple of information to the display means 4.

In step S71, the input means 2 also receives input of a selection model. The estimation results display system 1 stores the selection model in a storage device (not depicted in FIG. 24).

The display means 4 then displays the first graph 71 and the second graph 72, and also displays the third graph 73 representing the changes of the value of each attribute in the estimation data (step S72). The operation of the display means 4 displaying the first graph 71 and the second graph 72 is the same as the operation of the display means 4 displaying the first graph 71 and the second graph 72 in Exemplary Embodiment 5. In step S72, the screen depicted in FIG. 25 is displayed. In Exemplary Embodiment 8 and below-mentioned modifications, the display means 4 does not need to display a cursor in step S72 as there is no need for display in response to point and click or the like.

The display means 4 can display the third graph 73 by displaying the graph in heat map form of representing, for each type of attribute in the estimation data, the color or pattern corresponding to the range to which the attribute value belongs. The third graph 73 is, however, not limited to a graph in heat map form, and may be a line graph representing the changes of the value of each attribute or the like.

In step S72, the display means 4 sets the horizontal axes of the first to third graphs to be common. The display means 4 preferably displays the first to third graphs in vertically aligned state.

The display means 4 references to a node indicating each condition in the selection model, and employs a value used in the condition as one of the boundary values when dividing the attribute value range. This has already been described above, and so its description is omitted here.

The display means 4 may also display the icons 75 to 77, etc. (see FIG. 25).

In this exemplary embodiment, the icons 75 to 77, etc., associated with the coordinate values in the vertical axis representing the type of the learning model may be not displayed. Moreover, a value included in a condition such as "condition that air temperature is 20° C. or more" may be not used as a boundary value when dividing the attribute value range. In the case where the display means 4 does not display the icons 75 to 77, etc. and does not use the value included in the condition as a boundary value, the selection model need not be input to the input means 2 in step S71. In this exemplary embodiment, the display means 4 may display, in the third graph 73, the changes of the value of an attribute other than the attributed used when selecting the learning model. The same applies to the below-mentioned modifications of this exemplary embodiment.

According to this exemplary embodiment, the third graph 73 representing the changes of the value of each attribute in the estimation data is displayed together with the first graph 71 and the second graph 72. This enables the observer to observe the estimated value, the learning model used for deriving the estimated value, and each attribute used when selecting the learning model in association with each other. The observer can therefore estimate the tendency of each attribute when selecting each individual learning model.

In addition, by associating the boundary value when dividing the attribute value range with the value used in the condition in the selection model, the position at which the learning model is switched in the second graph 72 and the position at which the color or pattern is switched in the heat map in the third graph 73 are aligned. This enables the observer to more easily recognize the estimated value, the learning model used for deriving the estimated value, and each attribute used when selecting the learning model. In detail, when one learning model is switched to another learning model at some timing in the second graph 72, the observer can easily recognize which attribute value causes the switching of the learning model.

In this exemplary embodiment, too, the observer can recognize which learning model is selected when deriving an estimation result, as in Exemplary Embodiment 5.

Figure 27:
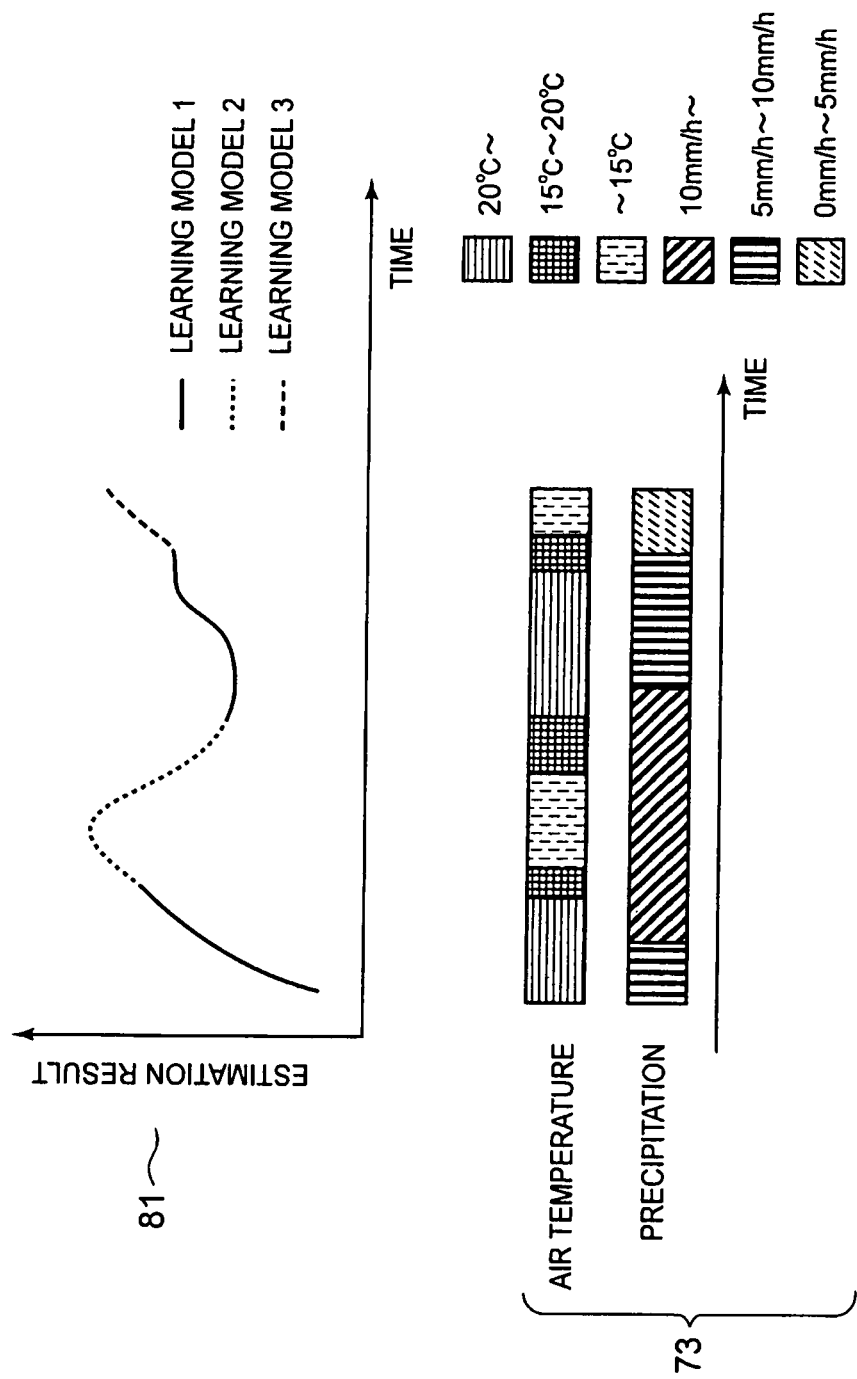
FIG. 27 is an explanatory diagram depicting an example of a screen displayed in Modification 1 of Exemplary Embodiment 8.

The following describes modifications of Exemplary Embodiment 8. In Exemplary Embodiment 8, the display means 4 displays the third graph 73 together with the first graph 71 and the second graph 72. In Modification 1 of Exemplary Embodiment 8, the graph (see FIG. 19(*a*)) in Exemplary Embodiment 6 may be displayed instead of the first graph 71 and the second graph 72. FIG. 27 is an explanatory diagram depicting an example of a screen displayed in Modification 1 of Exemplary Embodiment 8. In the following description, the third graph 73 is referred to as "attribute graph 73".

In step S72, the display means 4 may display a graph 81 depicted in FIG. 27 instead of the first graph 71 and the second graph 72. In the case of displaying the graph 81, the display means 4 may display the graph in which the symbol representing each estimation result is arranged in predetermined order along the horizontal axis and the estimation result is set as a coordinate in the vertical axis direction, where the type of the symbol representing the estimation result is changed depending on the learning model corresponding to the estimation result, as in Exemplary Embodiment 6. The operation of the display means 4 displaying the attribute graph 73 is the same as the operation of the display means 4 displaying the third graph 73 in Exemplary Embodiment 8.

The display means 4 sets the horizontal axis of the graph 81 depicted in FIG. 27 and the horizontal axis of the attribute graph 73 to be common. The display means 4 sets the x coordinate of the symbol in the graph 81 representing the estimation result and the x coordinate of the color or pattern representing the value of estimation data corresponding to the estimation result to be common.

Modification 1 of Exemplary Embodiment 8 described above has the same advantageous effects as Exemplary Embodiment 8.

Figure 28:
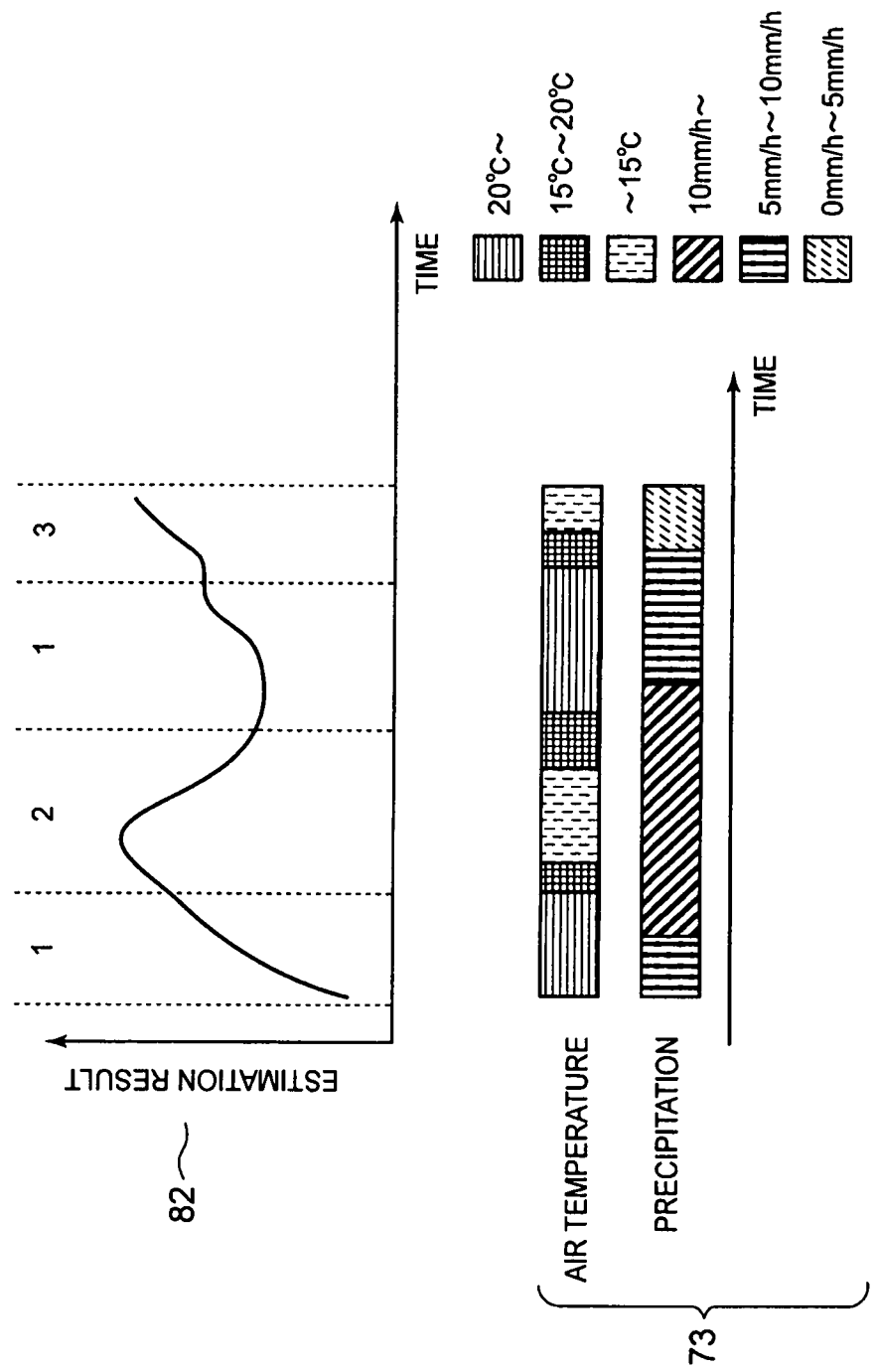
FIG. 28 is an explanatory diagram depicting an example of a screen displayed in Modification 2 of Exemplary Embodiment 8.

In Modification 2 of Exemplary Embodiment 8, the graph (see FIG. 22(*a*)) in Exemplary Embodiment 7 may be displayed instead of the first graph 71 and the second graph 72. FIG. 28 is an explanatory diagram depicting an example of a screen displayed in Modification 2 of Exemplary Embodiment 8.

In step S72, the display means 4 may display a graph 82 depicted in FIG. 28 instead of the first graph 71 and the second graph 72. In the case of displaying the graph 82, the display means 4 may display the graph in which the symbol representing each estimation result is arranged in predetermined order along the horizontal axis and the estimation result is set as a coordinate in the vertical axis direction, where the region in the graph is divided depending on the learning model corresponding to the estimation result represented by the symbol, as in Exemplary Embodiment 7. The operation of the display means 4 displaying the attribute graph 73 is the same as the operation of the display means 4 displaying the third graph 73 in Exemplary Embodiment 8.

The display means 4 sets the horizontal axis of the graph 82 depicted in FIG. 28 and the horizontal axis of the attribute graph 73 to be common. The display means 4 sets the x coordinate of the symbol in the graph 82 representing the estimation result and the x coordinate of the color or pattern representing the value of each attribute corresponding to the estimation result to be common.

Modification 2 of Exemplary Embodiment 8 described above has the same advantageous effects as Exemplary Embodiment 8.

In each modification of Exemplary Embodiment 8 described above, too, the display means 4 may reference to the node indicating each condition in the selection model, and employ the value used in the condition as one of the boundary values when dividing the attribute value range.

In each modification of Exemplary Embodiment 8, the display means 4 does not need to display the icons 75 to 77 (see FIG. 25) because the second graph 72 is not displayed.

Figure 29:
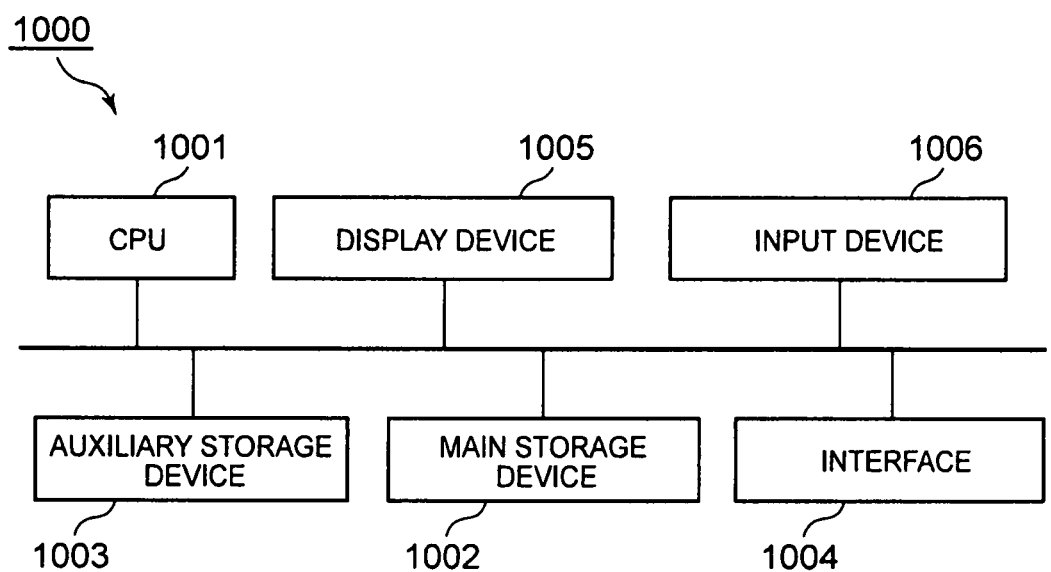
FIG. 29 is a schematic block diagram depicting an example of the structure of a computer according to each exemplary embodiment of the present invention.

FIG. 29 is a schematic block diagram depicting an example of the structure of a computer according to each exemplary embodiment of the present invention. A computer 1000 includes a CPU 1001, a main storage device 1002, an auxiliary storage device 1003, an interface 1004, a display device 1005, and an input device 1006.

The estimation results display system 1 in each exemplary embodiment is implemented by the computer 1000. The operation of the estimation results display system 1 is stored in the auxiliary storage device 1003 in the form of a program (estimation results display program). The CPU 1001 reads the program from the auxiliary storage device 1003, expands the program in the main storage device 1002, and executes the aforementioned process according to the program.

The auxiliary storage device 1003 is an example of a non-transitory tangible medium. Examples of the non-transitory tangible medium include a magnetic disk, magneto-optical disk, CD-ROM, DVD-ROM, and semiconductor memory connected via the interface 1004. In the case where the program is distributed to the computer 1000 through a communication line, the computer 1000 to which the program has been distributed may expand the program in the main storage device 1002 and execute the aforementioned process.

The program may realize part of the aforementioned process. The program may be a differential program that realizes the aforementioned process in combination with another program already stored in the auxiliary storage device 1003.

Figure 30:
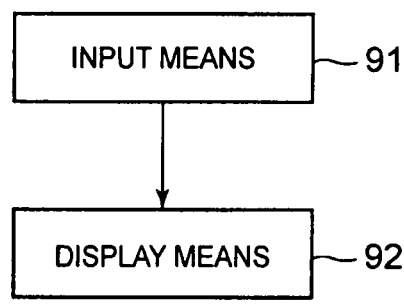
FIG. 30 is a block diagram depicting an overview of an estimation results display system according to the present invention.

An overview of the present invention is given below. FIG. 30 is a block diagram depicting an overview of an estimation results display system according to the present invention. The estimation results display system according to the present invention includes input means 91 and display means 92.

The input means 91 (e.g. the input means 2) receives input of information associating information indicating a learning model selected depending on a determination result of whether or not an attribute in estimation data including one or more types of attributes satisfies one or more types of conditions and an estimation result derived using the learning model.

The display means 92 (e.g. the display means 4) displays together the estimation result, the information indicating the learning model, and a condition subjected to determination of whether or not satisfied by the attribute in the estimation data when selecting the learning model.

With such a structure, in the case of displaying an estimation result derived using a learning model, persons can recognize how condition determination is performed to select the learning model.

The input means 2 may receive input of information associating information indicating a learning model selected depending on a determination result of whether or not an attribute in estimation data including one or more types of attributes satisfies one or more types of conditions, an estimation result derived using the learning model, and the estimation data.

The display means 4 may display a change of the estimation result and a change of the learning model, and displays a graph representing a change of the attribute in the estimation data.

With such a structure, persons can estimate the tendency of each attribute in estimation data when selecting each individual learning model.

The foregoing exemplary embodiments can be described as, but not limited to, the following supplementary notes.

(Supplementary note 1) An estimation results display system including: input means for receiving input of information associating information indicating a learning model selected depending on a determination result of whether or not an attribute in estimation data including one or more types of attributes satisfies one or more types of conditions and an estimation result derived using the learning model; and display means for displaying the estimation result, in association with the information indicating the learning model used for deriving the estimation result and a condition subjected to determination of whether or not satisfied by the attribute in the estimation data when selecting the learning model.

(Supplementary note 2) The estimation results display system according to Supplementary not 1, wherein the display means displays a scatter graph representing the estimation result by a symbol, changes a type of the symbol depending on the learning model, and represents, on the symbol, the condition subjected to the determination of whether or not satisfied by the attribute in the estimation data when selecting the learning model.

(Supplementary note 3) The estimation results display system according to Supplementary note 1, wherein the display means displays a scatter graph representing the estimation result by a symbol, changes a type of the symbol depending on the learning model, and in the case where any symbol in the scatter graph is selected, displays a condition subjected to determination of whether or not satisfied by an attribute in estimation data when selecting a learning model corresponding to an estimation result represented by the selected symbol.

(Supplementary note 4) The estimation results display system according to Supplementary note 1, wherein the input means receives input of, as display data of a selection model for selecting a learning model, display data of a tree structure graph in which each leaf node represents a learning model and each node other than the leaf node represents a condition for the attribute in the estimation data, and wherein the display means displays a scatter graph representing the estimation result by a symbol, changes a type of the symbol depending on the learning model, and in the case where any symbol in the scatter graph is selected, displays the tree structure graph in which a path from a root node in a tree structure to a learning model corresponding to an estimation result represented by the selected symbol is highlighted.

(Supplementary note 5) The estimation results display system according to Supplementary note 1, wherein the input means receives input of, as display data of a selection model for selecting a learning model, display data in which conditions for the attribute in the estimation data are assigned to a plurality of axes and learning models corresponding to the conditions are indicated in a space defined by the axes, and wherein the display means displays a scatter graph representing the estimation result by a symbol, changes a type of the symbol depending on the learning model, and in the case where any symbol in the scatter graph is selected, highlights a part in the space that corresponds to a learning model corresponding to an estimation result represented by the selected symbol.

(Supplementary note 6) The estimation results display system according to Supplementary note 1, wherein the display means displays a first graph in which a symbol representing the estimation result is arranged in predetermined order, displays a second graph in which a symbol representing the learning model corresponding to the estimation result is arranged in the predetermined order, and in the case where any symbol in the second graph is selected, displays a condition subjected to determination of whether or not satisfied by an attribute in estimation data when selecting a learning model represented by the selected symbol.

(Supplementary note 7) The estimation results display system according to Supplementary note 1, wherein the display means displays a graph in which a symbol representing the estimation result is arranged in predetermined order and a type of the symbol is changed depending on the learning model corresponding to the estimation result, and in the case where any symbol is selected, displays a condition subjected to determination of whether or not satisfied by an attribute in estimation data when selecting a learning model corresponding to an estimation result represented by the selected symbol.

(Supplementary note 8) The estimation results display system according to Supplementary note 1, wherein the display means displays a graph in which a symbol representing the estimation result is arranged in predetermined order with a region in the graph being divided depending on the learning model corresponding to the estimation result represented by the symbol, and in the case where any symbol is selected, displays a condition subjected to determination of whether or not satisfied by an attribute in estimation data when selecting a learning model corresponding to an estimation result represented by the selected symbol.

(Supplementary note 9) The estimation results display system according to any of Supplementary notes 1 to 8, wherein the input means receives input of information associating the information indicating the learning model selected depending on the determination result of whether or not the attribute in the estimation data including one or more types of attributes satisfies one or more types of conditions, the estimation result derived using the learning model, and the estimation data, and a selection model for selecting the learning model, and wherein the estimation results display system includes condition specifying means for specifying the condition subjected to the determination of whether or not satisfied by the attribute in the estimation data when selecting the learning model, using the estimation data and the selection model.

(Supplementary note 10) The estimation results display system according to any of Supplementary notes 1 to 5, wherein the display means displays a scatter graph representing a value of the estimation result by a coordinate at which a symbol is positioned.

(Supplementary note 11) The estimation results display system according to any of Supplementary notes 1 to 5, wherein the display means displays a scatter graph representing the estimation result by a type of a symbol.

(Supplementary note 12) The estimation results display system according to Supplementary note 1, wherein the display means displays a first graph that is a line graph representing a time-series change of the estimation result, displays a second graph in which a symbol representing the learning model corresponding to the estimation result is arranged in predetermined order, and in the case where any symbol in the second graph is selected, displays a condition subjected to determination of whether or not satisfied by an attribute in estimation data when selecting a learning model represented by the selected symbol.

(Supplementary note 13) The estimation results display system according to Supplementary note 1, wherein the display means displays a line graph that represents a time-series change of the estimation result and in which an attribute of a line is changed depending on the learning model corresponding to the estimation result, and in the case where a part on the line in the line graph is selected, displays a condition subjected to determination of whether or not satisfied by an attribute in estimation data when selecting a learning model corresponding to an estimation result represented by the selected part.

(Supplementary note 14) The estimation results display system according to Supplementary note 1, wherein the display means displays a line graph that represents a time-series change of the estimation result with a region in the line graph being divided depending on the learning model corresponding to the estimation result, and in the case where a part on the line in the line graph is selected, displays a condition subjected to determination of whether or not satisfied by an attribute in estimation data when selecting a learning model corresponding to an estimation result represented by the selected part.

(Supplementary note 15) An estimation results display system including: input means for receiving input of information associating information indicating a learning model selected depending on a determination result of whether or not an attribute in estimation data including one or more types of attributes satisfies one or more types of conditions, an estimation result derived using the learning model, and the estimation data; and display means for displaying a temporal change of the estimation result and a temporal change of the learning model, and displaying a graph representing a temporal change of the attribute in the estimation data.

(Supplementary note 16) The estimation results display system according to Supplementary note 15, wherein the display means displays, as the graph representing the temporal change of the attribute in the estimation data, a graph in heat map form representing a color or a pattern corresponding to a value range of the attribute, and employs, as one of a plurality of boundary values of the value range of the attribute, a value used in a condition that is used when selecting the learning model.

(Supplementary note 17) The estimation results display system according to Supplementary note 15 or 16, wherein the display means displays the temporal change of the estimation result and the temporal change of the learning model, by displaying a first graph in which a symbol representing the estimation result is arranged in predetermined order and a second graph in which a symbol representing the learning model corresponding to the estimation result is arranged in the predetermined order.

(Supplementary note 18) The estimation results display system according to Supplementary note 15 or 16, wherein the display means displays the temporal change of the estimation result and the temporal change of the learning model, by displaying a graph in which a symbol representing the estimation result is arranged in predetermined order and a type of the symbol is changed depending on the learning model corresponding to the estimation result.

(Supplementary note 19) The estimation results display system according to Supplementary note 15 or 16, wherein the display means displays the temporal change of the estimation result and the temporal change of the learning model, by displaying a graph in which a symbol representing the estimation result is arranged in predetermined order with a region in the graph being divided depending on the learning model corresponding to the estimation result represented by the symbol.

(Supplementary note 20) An estimation results display method including: receiving input of information associating information indicating a learning model selected depending on a determination result of whether or not an attribute in estimation data including one or more types of attributes satisfies one or more types of conditions and an estimation result derived using the learning model; and displaying the estimation result, in association with the information indicating the learning model used for deriving the estimation result and a condition subjected to determination of whether or not satisfied by the attribute in the estimation data when selecting the learning model.

(Supplementary note 21) An estimation results display method including: receiving input of information associating information indicating a learning model selected depending on a determination result of whether or not an attribute in estimation data including one or more types of attributes satisfies one or more types of conditions, an estimation result derived using the learning model, and the estimation data; and displaying a temporal change of the estimation result and a temporal change of the learning model, and displaying a graph representing a temporal change of the attribute in the estimation data.

(Supplementary note 22) An estimation results display program provided in a computer including input means for receiving input of information associating information indicating a learning model selected depending on a determination result of whether or not an attribute in estimation data including one or more types of attributes satisfies one or more types of conditions and an estimation result derived using the learning model, the estimation results display program causing the computer to execute a display process of displaying the estimation result, in association with the information indicating the learning model used for deriving the estimation result and a condition subjected to determination of whether or not satisfied by the attribute in the estimation data when selecting the learning model.

(Supplementary note 23) An estimation results display program provided in a computer including input means for receiving input of information associating information indicating a learning model selected depending on a determination result of whether or not an attribute in estimation data including one or more types of attributes satisfies one or more types of conditions, an estimation result derived using the learning model, and the estimation data, the estimation results display program causing the computer to execute a display process of displaying a temporal change of the estimation result and a temporal change of the learning model, and displaying a graph representing a temporal change of the attribute in the estimation data.

The example depicted in each of FIGS. 6, 9, 11, and 14 is a display example of presenting the estimation result and the actual measured value in comparison. In such an example, the estimation results display system 1 may include means for receiving a correction of a condition or the like in the selection model from the observer. For example, suppose an estimation result derived using a learning model deviates from an actual measured value. In this case, the observer points and clicks the symbol on the scatter graph, reviews the selection model, and changes the selection model or the learning model. The estimation process using the changed selection model and learning model is then performed, and the estimation result is displayed. Upon confirming that the symbol representing the estimation result is closer to y=x in the scatter graph, the observer can recognize that estimation accuracy has increased.

Although the present invention has been described with reference to the exemplary embodiments, the present invention is not limited to the foregoing exemplary embodiments. Various changes understandable by those skilled in the art can be made to the structures and details of the present invention within the scope of the present invention.

This application claims priority based on Japanese Patent Application No. 2014-219564 filed on Oct. 28, 2014, the disclosure of which is incorporated herein in its entirety.

INDUSTRIAL APPLICABILITY

The present invention is suitably applied to an estimation results display system that displays an estimation result derived using a learning model.

REFERENCE SIGNS LIST 1 estimation results display system
2 input means
3 condition specifying means
4 display means
7 cursor manipulation means

The invention claimed is:

1. An estimation results display system comprising:
an input unit, implemented by an input device, for receiving input of information associating information indicating a learning model selected depending on a determination result of whether or not an attribute in estimation data including one or more types of attributes satisfies one or more types of conditions and an estimation result derived using the learning model; and
a display unit, implemented by a processor and a display device, for displaying the estimation result, in association with the information indicating the learning model used for deriving the estimation result and a condition subjected to determination of whether or not satisfied by the attribute in the estimation data when selecting the learning model;
wherein the input unit receives input of, as display data of a selection model for selecting a learning model, display data of a tree structure graph in which each leaf node represents a learning model and each node other than the leaf node represents a condition for the attribute in the estimation data; and
wherein the display unit displays a scatter graph representing the estimation result by a symbol, changes a type of the symbol depending on the learning model, and in the case where any symbol in the scatter graph is selected, displays the tree structure graph in which a path from a root node in a tree structure to a learning model corresponding to an estimation result represented by the selected symbol is highlighted.

2. The estimation results display system according to claim 1, wherein the input unit receives input of information associating the information indicating the learning model selected depending on the determination result of whether or not the attribute in the estimation data including one or more types of attributes satisfies one or more types of conditions, the estimation result derived using the learning model, and the estimation data, and the selection model, and
wherein the estimation results display system comprises a condition specifying unit, implemented by the processor, for specifying the condition subjected to the determination of whether or not satisfied by the attribute in the estimation data when selecting the learning model, using the estimation data and the selection model.

3. The estimation results display system according to claim 1, wherein the display unit displays a scatter graph representing a value of the estimation result by a coordinate at which a symbol is positioned.

4. The estimation results display system according to claim 1, wherein the display unit displays a scatter graph representing the estimation result by a type of a symbol.

5. An estimation results display system comprising:
an input unit, implemented by an input device, for receiving input of information associating information indicating a learning model selected depending on a determination result of whether or not an attribute in estimation data including one or more types of attributes satisfies one or more types of conditions, an estimation result derived using the learning model, and the estimation data; and
a display unit, implemented by a processor and a display device, for displaying a temporal change of the estimation result and a temporal change of the learning model, and displaying a graph representing a temporal change of the attribute in the estimation data;
wherein the display unit displays, as the graph representing the temporal change of the attribute in the estimation data, a graph in heat map form representing a color or a pattern corresponding to a value range of the attribute, and employs, as one of a plurality of boundary values of the value range of the attribute, a value used in a condition that is used when selecting the learning model.

6. The estimation results display system according to claim 5, wherein the display unit displays the temporal change of the estimation result and the temporal change of the learning model, by displaying a first graph in which a symbol representing the estimation result is arranged in predetermined order and a second graph in which a symbol representing the learning model corresponding to the estimation result is arranged in the predetermined order.

7. The estimation results display system according to claim 5, wherein the display unit displays the temporal change of the estimation result and the temporal change of the learning model, by displaying a graph in which a symbol representing the estimation result is arranged in predetermined order and a type of the symbol is changed depending on the learning model corresponding to the estimation result.

8. The estimation results display system according to claim 5, wherein the display unit displays the temporal change of the estimation result and the temporal change of the learning model, by displaying a graph in which a symbol representing the estimation result is arranged in predetermined order with a region in the graph being divided depending on the learning model corresponding to the estimation result represented by the symbol.

9. An estimation results display method comprising:
receiving input of information associating information indicating a learning model selected depending on a determination result of whether or not an attribute in estimation data including one or more types of attributes satisfies one or more types of conditions and an estimation result derived using the learning model; and
displaying the estimation result, in association with the information indicating the learning model used for deriving the estimation result and a condition subjected to determination of whether or not satisfied by the attribute in the estimation data when selecting the learning model;
wherein the estimation results display method comprises:
receiving input of, as display data of a selection model for selecting a learning model, display data of a tree structure graph in which each leaf node represents a learning model and each node other than the leaf node represents a condition for the attribute in the estimation data; and
displaying a scatter graph representing the estimation result by a symbol, changing a type of the symbol depending on the learning model, and in the case where any symbol in the scatter graph is selected, displaying the tree structure graph in which a path from a root node in a tree structure to a learning model corresponding to an estimation result represented by the selected symbol is highlighted.

10. An estimation results display method comprising:
receiving input of information associating information indicating a learning model selected depending on a determination result of whether or not an attribute in estimation data including one or more types of attributes satisfies one or more types of conditions, an estimation result derived using the learning model, and the estimation data; and
displaying a temporal change of the estimation result and a temporal change of the learning model, and displaying a graph representing a temporal change of the attribute in the estimation data;
wherein the estimation results display method comprises:
displaying, as the graph representing the temporal change of the attribute in the estimation data, a graph in heat map form representing a color or a pattern corresponding to a value range of the attribute, and employing, as one of a plurality of boundary values of the value range of the attribute, a value used in a condition that is used when selecting the learning model.

11. A non-transitory computer readable recording medium in which an estimation results display program is recorded, the estimation results display program provided in a computer including an input unit for receiving input of information associating information indicating a learning model selected depending on a determination result of whether or not an attribute in estimation data including one or more types of attributes satisfies one or more types of conditions and an estimation result derived using the learning model, the estimation results display program causing the computer to execute
a display process of displaying the estimation result, in association with the information indicating the learning model used for deriving the estimation result and a condition subjected to determination of whether or not satisfied by the attribute in the estimation data when selecting the learning model;
wherein the input unit receives input of, as display data of a selection model for selecting a learning model, display data of a tree structure graph in which each leaf node represents a learning model and each node other than the leaf node represents a condition for the attribute in the estimation data; and
wherein the estimation results display program causes the computer to execute
in the display process, displaying a scatter graph representing the estimation result by a symbol, changing a type of the symbol depending on the learning model, and in the case where any symbol in the scatter graph is selected, displaying the tree structure graph in which a path from a root node in a tree structure to a learning model corresponding to an estimation result represented by the selected symbol is highlighted.

12. A non-transitory computer readable recording medium in which an estimation results display program is recorded, the estimation results display program provided in a computer including an input unit for receiving input of information associating information indicating a learning model selected depending on a determination result of whether or not an attribute in estimation data including one or more types of attributes satisfies one or more types of conditions, an estimation result derived using the learning model, and the estimation data, the estimation results display program causing the computer to execute
a display process of displaying a temporal change of the estimation result and a temporal change of the learning model, and displaying a graph representing a temporal change of the attribute in the estimation data,
wherein the estimation results display program causes the computer to execute
in the display process, displaying, as the graph representing the temporal change of the attribute in the estimation data, a graph in heat map form representing a color or a pattern corresponding to a value range of the attribute, and employing, as one of a plurality of boundary values of the value range of the attribute, a value used in a condition that is used when selecting the learning model.

* * * * *